(12) United States Patent
Yates

(10) Patent No.: US 10,232,938 B2
(45) Date of Patent: Mar. 19, 2019

(54) UNMANNED SUPPLY DELIVERY AIRCRAFT

(71) Applicant: W.MORRISON CONSULTING GROUP, INC., Aliso Viejo, CA (US)

(72) Inventor: William M. Yates, Aliso Viejo, CA (US)

(73) Assignee: W.Morrison Consulting Group, Inc., Aliso Viejo, CA (US)

( * ) Notice: Subject to any disclaimer, the term of this patent is extended or adjusted under 35 U.S.C. 154(b) by 167 days.

(21) Appl. No.: 15/198,946

(22) Filed: Jun. 30, 2016

(65) Prior Publication Data

US 2017/0001724 A1 Jan. 5, 2017

Related U.S. Application Data

(60) Provisional application No. 62/187,778, filed on Jul. 1, 2015.

(51) Int. Cl.
| | |
|---|---|
| *B64C 39/12* | (2006.01) |
| *B64C 3/56* | (2006.01) |
| *B64C 1/26* | (2006.01) |
| *B64D 9/00* | (2006.01) |
| *B64C 39/02* | (2006.01) |
| *B64C 5/04* | (2006.01) |
| *B64D 17/80* | (2006.01) |
| *G05D 1/10* | (2006.01) |
| *G05D 1/00* | (2006.01) |

(52) U.S. Cl.
CPC .............. *B64C 39/024* (2013.01); *B64C 1/26* (2013.01); *B64C 3/56* (2013.01); *B64C 5/04* (2013.01); *B64C 39/12* (2013.01); *B64D 9/00* (2013.01); *B64D 17/80* (2013.01); *G05D 1/0011* (2013.01); *G05D 1/101* (2013.01); *B64C 2201/128* (2013.01)

(58) Field of Classification Search
CPC ................ B64C 1/22; B64C 2201/102; B64C 2201/128
See application file for complete search history.

(56) References Cited

U.S. PATENT DOCUMENTS 3,669,385 A * 6/1972 Glantz ...................... B64C 1/00
244/13
6,056,237 A * 5/2000 Woodland ................ B64C 3/40
244/120

(Continued)

OTHER PUBLICATIONS

U.S. Appl. No. 14/882,137—Pending.

*Primary Examiner* — Joseph W Sanderson
(74) *Attorney, Agent, or Firm* — Dentons US LLP

(57) ABSTRACT

A heavy payload, autonomous UAV able to deliver supply by way of airdrop with more precision and at a lower cost. The UAV can be equipped with a movable wing system. The UAV can include a removable storage box. The UAV can be equipped with a drogue parachute for deploying the wings upon jettison of the UAV from a mothership. The UAV can be controlled remotely or it can operate autonomously. The UAV can include canard wings. The canard wings and the movable wings can include ailerons to effectuate flight control of the UAV. The UAV can be reusable or can be an expandable UAV. The UAV's wings can be configured to automatically separate from the UAV during the landing sequence.

19 Claims, 21 Drawing Sheets

(56) References Cited

U.S. PATENT DOCUMENTS

| | | | | |
|---|---|---|---|---|
| 6,817,573 B2* | 11/2004 | Harrison | ............ | B64C 29/0075 244/120 |
| 6,889,942 B2 | 5/2005 | Preston | | |
| 7,261,257 B2* | 8/2007 | Helou, Jr. | ................. | B64C 1/00 244/118.1 |
| 7,344,109 B1* | 3/2008 | Rezai | ....................... | B64C 1/22 244/118.2 |
| 7,854,410 B2* | 12/2010 | Fanucci | ................. | B64C 39/024 244/139 |
| 7,975,774 B2* | 7/2011 | Akcasu | ................. | A62C 3/025 169/28 |
| 8,946,607 B2* | 2/2015 | Gettinger | ............. | B64C 39/024 244/3.27 |
| 9,108,713 B2* | 8/2015 | Tao | ........................... | B64C 3/44 |
| 9,296,270 B2* | 3/2016 | Parks | ....................... | B60F 5/02 |
| 9,868,524 B2* | 1/2018 | Welsh | ................... | B64C 39/024 |
| 9,957,035 B2* | 5/2018 | Valasek | ..................... | B64C 1/26 |
| 2006/0108477 A1* | 5/2006 | Helou, Jr. | ................. | B64C 1/00 244/137.1 |
| 2009/0026314 A1* | 1/2009 | Helou, Jr. | ................. | B64C 1/00 244/118.1 |
| 2009/0114773 A1* | 5/2009 | Helou, Jr. | .............. | B64C 1/061 244/137.1 |
| 2010/0012774 A1* | 1/2010 | Fanucci | ................ | B64C 39/024 244/49 |
| 2010/0065288 A1* | 3/2010 | Akcasu | .................. | A62C 3/025 169/53 |
| 2011/0226174 A1* | 9/2011 | Parks | ........................ | B60F 5/02 114/313 |
| 2012/0267473 A1* | 10/2012 | Tao | ........................... | B64C 3/44 244/38 |
| 2013/0146716 A1* | 6/2013 | Gettinger | .................. | B64C 3/56 244/215 |
| 2014/0217230 A1* | 8/2014 | Helou, Jr. | ............... | B64C 25/14 244/17.17 |
| 2015/0183519 A1* | 7/2015 | Llamas Sandin | ..... | B64C 1/1423 244/13 |
| 2016/0009363 A1* | 1/2016 | Valasek | ..................... | B64C 1/22 244/13 |
| 2017/0240276 A1* | 8/2017 | Zilberstein | .............. | B64C 31/02 |
| 2018/0086434 A1* | 3/2018 | Cook | ..................... | B64C 13/28 |
| 2018/0086454 A1* | 3/2018 | Cook | ................... | B64C 39/024 |
| 2018/0312252 A1* | 11/2018 | Yates | ..................... | B64C 31/02 |

* cited by examiner

UNMANNED SUPPLY DELIVERY AIRCRAFT

This application claims the benefit of U.S. Provisional Application No. 62/187,778, filed on Jul. 1, 2015, which is incorporated herein by reference.

BACKGROUND OF THE INVENTION

Field of the Invention

The present invention relates to an air delivery unmanned aircraft system.

Discussion of the Related Art

The ability to provide supplies in remote areas has always been a problem. Current supply methods typically involve convoys and air supply methods. However, providing an accurate delivery of supply can be very challenging and expensive.

The most accurate method of delivery has always been by land transportation. This methodology faces a number of challenges when the destination is in remote or potentially hazardous areas. Aside for the expense of the delivery and the time it takes, land transportation can also be subject to assaults or robberies along the way.

Air transportation can solve some of the above issues related with land transport, however, it is still very expensive and often times impractical depending on the location in which delivery is to be made. For example, this method can be impractical in places with dense vegetation and many canals and rivers. The landscape can make it difficult or even impossible at times for an aircraft to land. Airdrop requires a low flying aircraft that can be impractical in some instances. Also, the accuracy of providing supply via airdrop can often be less than desirable and inconsistent. Joint Precision Airdrop System "JPADS" is a current program of the U.S. Military that employs GPS steerable parachutes to attempt to guide heavy air dropped items from a cargo aircraft such as the C-5, C-17, C-130, or from heavy lift helicopters such as the V-22 and CH-53. JPADS is known to cost on the order of $30,000 per drop, and the limitations of steering a parachute through varied weather systems and from various drop altitudes has caused numerous payloads meant to resupply troops to become lost, damaged or inaccessible. A number of military personnel have become injured and killed during the process of searching for and retrieving items delivered via such steerable parachute drops. Accordingly, the U.S. Government has indicated an interest in increasing the accuracy of such troop resupply capabilities while simultaneously reducing the cost of such deliveries as much as tenfold. Many civil organizations have also expressed an interest in being able to precisely delivery heavy payloads of resupply materials such as during national disasters from airborne delivery platforms which obviate the need for landing zones, airports, ground transportation or to avoid such things as penetrating another nation's national borders while still being able to deliver relief supplies to such a nation from a safe, airborne standoff distance and altitude. Other relief missions such as stranded hikers, disabled ships, boats, or sailing vessels present logistical rescue difficulties where it is desirable to have the ability to precisely provide immediate emergency relief supplies, equipment, food, water, medical equipment such as medicines, oxygen, cardiac defibrillators and the like, or bilge pumps, life rafts and other equipment to prevent a vessel from sinking or to save the lives of people aboard a stricken vessel.

With the above problems in mind, it is needed a more efficient and cost effective method of providing supply that avoids one or more of the above stated problems.

SUMMARY OF THE INVENTION

Accordingly, the present invention is directed to an air delivery unmanned aircraft system that substantially obviates one or more of the problems due to limitations and disadvantages of the related art.

An advantage of the present invention is that it provides a cost effective, safe and accurate supply delivery system.

Another advantage is that it provides a cargo container that can quickly and easily be retrieved by the intended recipient after landing.

Still another advantage of the present invention is that it provides an easily deployable supply delivery aircraft.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an unmanned delivery aircraft including a fuselage cargo container. The fuselage cargo container having a lid and a bottom portion, a first pivoting wing system connected to the lid, a second pivoting wing system connected to the lid, a guidance control system, and one or more flight controls operable by the guidance control system. Each of the first and second pivoting wing assemblies can pivot from a stowed position to a deployed position. The first and second pivoting wing systems can each include either a single pivoting wing, or two or more pivoting wings. The first and second pivoting wing systems can have the same design. The first pivoting wing system can include main wings and the second pivoting wing system can include canard wings. The lid can be detachably connected to the bottom portion. At least one latch can secure the lid to the bottom portion. The fuselage cargo container can include at least one storage compartment. The fuselage cargo container can include one or more handles. The fuselage cargo container can be airtight. Each pivoting wing system can also include a movable flight control surface. At least one actuator on each wing system can be used to move the flight control surface for that wing system. One or more torsion springs can be located at a pivot point of at least one of the first and second wing systems. The guidance control system can be operated in autonomous or manual modes. A drogue parachute can be attached to the fuselage cargo container. A nose cone can be detachably connected to the fuselage cargo container. The guidance control system can be located inside the nose cone. The first and second pivoting wing systems can each pivot 90 degrees.

In accordance with another embodiment of the present invention, as broadly described an unmanned delivery aircraft having a fuselage. The fuselage can include a lid detachably connected to a bottom portion. The aircraft can further include at least two wings pivotally connected to the lid, at least a torsion spring located at a pivot point of the at least two wings, and a guidance control system.

In accordance with another embodiment of the present invention, as broadly described an unmanned supply delivery aircraft having a fuselage capable of storing supplies, at least one pivoting wing detachably connected to the fuselage, the wing having a stowed position and a deployed position. The aircraft may also have a guidance control system and one or more flight controls operable by the guidance control system. The at least one wing can pivot from the stowed position to the deployed position after being jettisoned from the mothership. The guidance control system operates the at least one flight control during flight. The at least one wing detaches from the fuselage during a landing sequence. At least one wing can be configured to detach from the fuselage in the final moments of flight prior to touchdown. At least one wing can be configured to detach from the fuselage upon contact with the ground. At least one wing can be configured to detach from the fuselage by ground personnel immediately upon landing. The fuselage can be a mobile storage case having provisions to be easily moved after landing. The mobile storage case can have at least one of carrying handles, wheels, and channels to accommodate forklift skids. The aircraft may also have four pivoting wings. Two of the pivoting wings can be main wings and two of the pivoting wings can be canard wings. The pivoting wings can be restrained in the stowed position and spring loaded towards the deployed position. The guidance control system can be autonomous. A ground-sensing device such as a laser altimeter can signal the detachment of the at least one wing prior to landing. A mechanism can contact the ground during landing and triggers the detachment of at least one wing.

In accordance with another embodiment of the present invention, as broadly described an unmanned aerial vehicle including a fuselage able to store supply, a movable wing system in which one or more wings can be moved from a stowed position to a deployed position, a guidance control system, and flight controls. The UAV can further include a storage box designed to fit inside the fuselage. The fuselage can have a substantially round cross section. The fuselage can be a rolled aluminum sheet metal welded to cast aluminum bulkheads. The movable wing system can include at least two wings. Sprockets can be connected to the at least two wings. A drogue parachute can be connected to a chain engaged with the sprockets such that when the drogue parachute deploys it pulls on the chain and turns the sprockets and rotate the at least two wings into a deployed position. The UAV can include a nose cone. The nose cone can have at least two canard wings. A cargo hold can be permanently connected to the movable sing system. The fuselage can be designed to connect to the cargo hold. A detachable cap can be detachably connected to the cargo hold. The UAV can be an expendable aircraft. The UAV can be constructed of biodegradable materials.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
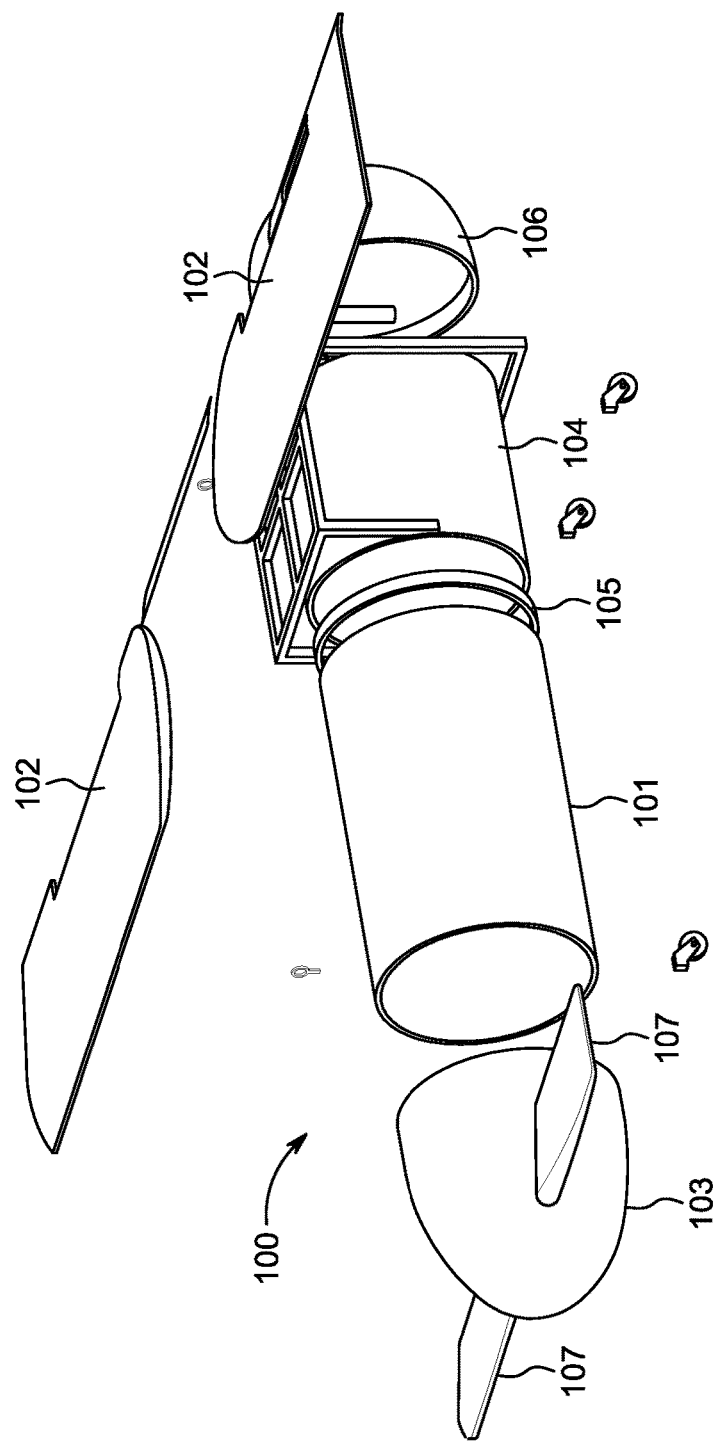
FIG. 1 is an exploded view of an exemplary embodiment of the UAV of the present invention.

An exploded view of an exemplary embodiment of an airborne system according to the present invention is illustrated in FIG. 1. The exemplary embodiment can include an unmanned aerial vehicle (UAV) 100, that can include a fuselage 101, a main wing system 102 that may include a cargo hold 104, an optional seal end or detachable cap 106, a nose cone 103 with an optional canard wing system 107, a guidance system (not shown), and a flight control system (not shown). The UAV 100 can be used as a delivery aircraft.

The fuselage 101 can be used for carrying a payload. The fuselage is illustrated as a substantially round cross section, however, the shape of the fuselage is not limited to a cylinder. In exemplary embodiments the fuselage can have a rectangular cross section. In alternative embodiments the fuselage can have an irregularly shaped cross section. In yet alternative embodiments the fuselage can have a square cross section. In preferred embodiments, the fuselage will generally have an aerodynamic cross section. The fuselage can be designed to carry any number of supply. The fuselage can be designed to carry food. The fuselage can be designed to carry tools. The fuselage can also be designed to carry various mechanical and/or electronic equipment. The type of electronic equipment is not limited, examples may include sensors, cameras, radios, or portable electronics. The fuselage can be designed to carry fluid. For example, the fuselage can be designed to carry water. In exemplary embodiments the fuselage can also be designed to carry chemicals or hazardous materials.

The fuselage can be formed of any durable material. In exemplary embodiments the fuselage is made of metal or metal alloy. In exemplary embodiments the fuselage can be made of aluminum (Al). In alternative embodiments, the fuselage can be made of plastic. In yet alternative embodiments, the fuselage can be made of fiberglass. The fuselage can alternatively be made of wood. In exemplary embodiments, the fuselage may also be formed using any combination of the above identified materials. In preferred embodiments, the fuselage is made of a light weight material. For example, a preferred embodiment can include a fuselage made of rolled aluminum sheet metal welded to cast aluminum bulkheads.

The fuselage can be equipped with any necessary equipment for the safe storage of the supply. For example, the fuselage can be equipped with impact foam or other padding. In alternative embodiments, the fuselage can be equipped with temperature controlled system that is able to maintain the payload at a set temperature. The fuselage can be equipped with insulation. The inside of the fuselage can be equipped with one or more braces that can clamp the payload and tightly secure it in a desired manner. In exemplary embodiments, the inside of the fuselage can also be compartmentalized.

In an exemplary embodiment the UAV can to carry supply load of up to 700 lb. The supply load may be stored solely in the fuselage. In the alternative, as described in more detail below, the supply load can be carried in the fuselage and cargo hold. Alternatively, the supply load can be carried at least in part in the sealed end or detachable cap. In yet the supply load can be carried at least in part in the nose cone that can be either integral with or detachably connected to the fuselage. In one embodiment, the supply load can be contained in a volume space that is 2 feet by 2 feet by 6 feet. The volume space may be cylindrical. The volume space can alternatively be a rectangular prism shape. The volume can alternatively be a non-geometric shape. The supply load can be protected and suspended in high impact foam located inside the fuselage.

In exemplary embodiments the fuselage can be made to separate from the UAV and be used as a portable storage device. The fuselage can be equipped with features to ease its transport. The fuselage can be equipped with one or more handles. The fuselage can also be equipped with wheels. The wheels can be retractable so as to prevent damage during landing of the UAV. The wheels can also be fixed. Alternatively, the fuselage can be designed to include a storage box. The storage box can be designed to fit inside the fuselage. The storage box can be designed to fit such that it is well protected by impact foam also provided inside the fuselage. In exemplary embodiments the storage box is surrounded by impact foam while inside the fuselage. The storage box can be used to store the supply intended for delivery. Once delivered by the UAV, the storage box can be removed from the fuselage for ease of transport of the supply without necessitating the carrying of any other portion of the UAV or of the fuselage.

The fuselage can be designed to engage main wing system 102. The main wing system can have any suitable wingspan. In exemplary embodiments the wingspan of the main wing system can be 20 feet. In alternative embodiments the wingspan can be anywhere between one inch and 50 feet. For example, the wingspan can be 1 in, 6 in, 1 ft, 5 ft, 10 ft, 15 ft, 20 ft, 25 ft, 30 ft, 35 ft, 40 ft, 45 ft, or 50 ft. These are just exemplary sizes. The size of the wingspan will depend on the overall size of the UAV, the payload weight it must carry and the desired glide ratio, among other factors. In exemplary embodiments the one or more wings of the main wing system can include an airfoil design. In preferred embodiments, the airfoil design is a National Advisory Committee For Aeronautics ("NACA") 4309 with a 3 ft chord. Other designs however may also be employed. The one or more wings that are part of the main wing system can also include one or more flight control actuators.

The one or more wings of the main wing system can include wing control surfaces configured to control the aircraft in yaw (as in a flying wing design). For example, the one or more flight control actuators can be used to control flight control surfaces such as flaps, spoilers, and/or ailerons that can be part of the one or more wings of the main wing system. The flight actuators can be electric actuators. Alternatively, the flight actuators can be pneumatic. In one pneumatic actuator embodiment, the fuselage may be designed to be airtight, and after the payload is placed inside the fuselage, the fuselage may be pressurized with compressed air or other gas, which may then be used in flight to provide pressure to the pneumatic actuators for flight control. This unusual control strategy is workable in the present invention, because of the very short duration flight times starting from the time of jettison at altitude all the way to the landing phase on the ground, which in exemplary cases gives a total flight time for the aircraft of approximately 10-20 minutes. In alternative embodiments the actuators can be hydraulic actuators. The actuators can be controlled by the on-board automatic flight guidance system. Alternatively, the actuators can be designed to receive commands from a remote operator. The connection to between the actuators and the on-board flight guidance system can be either wireless or by use of cables such as USB, Ethernet, fiberoptics and the like. Wireless connection can be radio, wi-fi, or similar method. The remote control signals can also be transmitted by way of any suitable wireless communication, including radio signals.

Use of ailerons can avoid the need for a vertical stabilizer or rudder to control yaw. In an exemplary embodiment the main wing system includes at least two wings. Each wing can have an independently operable aileron. Each wing can also have an independently operable spoiler or flap. Controlling of the flight control actuators and thus of the ailerons, spoilers or flaps can be performed either by remote control or can be accomplished via a controller located on board of the UAV. In exemplary embodiments the controller can determine the operation of the flight control actuators based on information such as global positioning system (GPS), altitude, desired destination, weather conditions, other flight conditions and the like. A more detailed description of the control equipment is provided later in this specification.

The flight control actuators and the control equipment on board the UAV can be powered by a power source. The power source can be one or more batteries. The one or more batteries can be stored anywhere on the UAV. In exemplary embodiments the batteries are also located inside the one or more wings of the main wing system. In alternative embodiments the one or more batteries can be stored in the fuselage. Alternatively, the one or more batteries can be stored in the cargo hold. The one or more batteries may be stored in the sealed end or detachable end of the cargo hold. In the alternative, the one or more batteries can be located in the nose cone. Alternative power source to a battery can be a capacitor. A capacitor may be stored in similar locations described above for the batteries. Other similar power storage devices can also be employed. The storage device, be a battery, capacitor or other structure can be rechargeable.

In exemplary embodiments, the power source can be recharged while the UAV is in flight. In alternative embodiments, the power source can be jettisoned from the UAV once depleted. In alternative embodiments, the power source can be replaced while the UAV is in flight. Alternatively, the power source can be recharged, removed or replaced before or after the UAV is in flight. In yet alternative embodiments, the power source can be one or more energy cells, such as for example solar cells. Solar cells can be located on the one or more wings of the main wing system. Solar cells can also be located on the canard wings if the UAV is so equipped. Solar cells may also be located anywhere on the body of the UAV. In preferred embodiments, one or more solar cells will be located such that they obtain best exposure to sunlight at least during UAV operation or flight.

In exemplary embodiments the fuselage is permanently attached to the main wing system. In alternative embodiments the fuselage is detachably engaged to the main wing system. In yet alternative embodiments the fuselage includes a permanently attached main wing system and also can detachably engage a second main wing system.

The main wing system can be constituted of one or more movable wings. In an exemplary embodiment the main wing system includes only one movable wing. In an alternative embodiment the main wing system includes at least two movable wings. In yet another exemplary embodiment, the main wing system includes more than two movable wings.

In alternative embodiments the main wing system can be one or more stationary wings. In exemplary embodiments, the main wing system includes at least one stationary wing. In alternative embodiments the main wing system includes at least two stationary wings. In yet alternative embodiments the main wing system includes more than two stationary wings.

In alternative embodiments, the main wing system can include at least one stationary wing and at least one movable wing.

The wings of the main wing system may be made of any suitable material. In exemplary embodiments the wings are made of metal. For example, the wings can be made of aluminum. In alternative embodiments the wings can be made of plastic. In yet alternative embodiments the wings may be made of fiberglass. In exemplary embodiments the wings can also be made of wood. In preferred embodiments the wings are made of the same material as the fuselage. However, this is not required. In exemplary embodiments the wings may be made of a material different from that used for the fuselage. Also, in exemplary embodiments, the wings can be made of a combination of the above identified materials. In a preferred embodiment the wings can be made of sheet metal bonded to a wing spar structure. In other embodiments, the wing spar and rib structure may be injection molded or cast and then covered by sheet metal, fiberglass, carbon fiber, balsa wood or fabrics. The wing structure may be a resin impregnated wood material that is known to be strong but also biodegradable.

The wings can be of any suitable shape. In exemplary embodiments, the wings of the main wing system have a rectangular shape. In alternative embodiments the wings of the main wing system have a tapered shape.

The wings may also include a shear failure point. In exemplary embodiments, the wings can break off during landing to further absorb the impact. In alternative embodiments, the wings can be made to break off during, or even after landing to make the UAV easier to carry.

The wings of the main wing system can be designed to move in a variety of manners. The movements of the wings can be linear or non-linear. In exemplary embodiments the wings of the main wing system can be rotatable. In exemplary embodiments the wings of the main wing system can be foldable. In alternative embodiments, the wings of the main wing system can be retractable, extendable, detachable, or rollable. The positioning of the wings of the main wing system can also be simple and include only two settings, deployed and stowed. In alternative embodiments, however, the positioning of the wings of the main wing system can be adjustable to any desired position allowed by the mechanism. For example, in embodiments having rotatable wings, the position may be adjusted between full deployment to full stowed by any given degree of rotation. For example the wings could be set at 25 degrees from stowed, 45 degrees from stowed, or half deployed, or 25 degrees from deployed. These are only exemplary embodiments, adjustment of the rotation of the wings can be set as desired. Likewise, the degree of fold, roll, extension and retraction of the wings of the main wing system can be either set as fully deployed or fully stowed or any position there between as may be desired.

Figure 2:
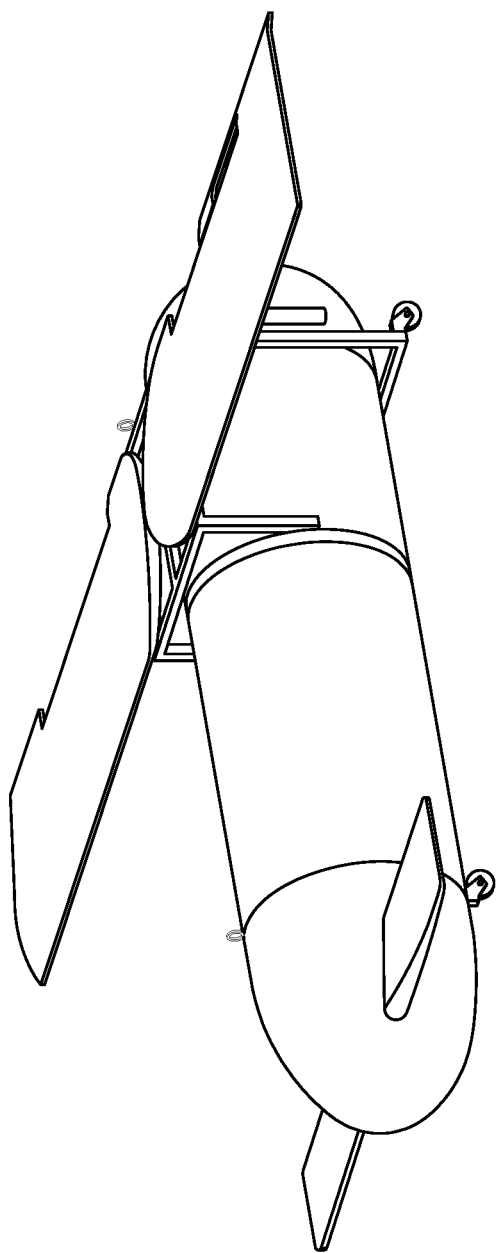
FIG. 2 is an exemplary embodiment of the UAV of the present invention in an exemplary fully deployed state.

An exemplary main wing system including two movable wings is illustrated in FIG. 2 as item 102. The movable wing can include a mechanism that allows for a stowed and a deployed positioning of the wing.

Figure 3:
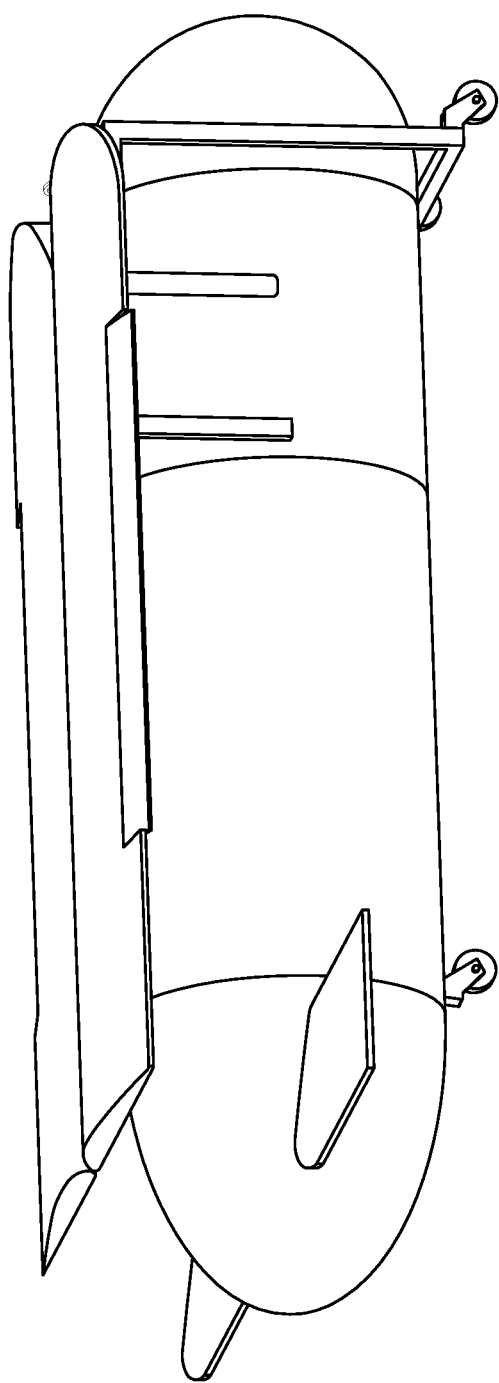
FIG. 3 is an exemplary embodiment of the UAV of the present invention in an exemplary stowed state.
Figure 4:
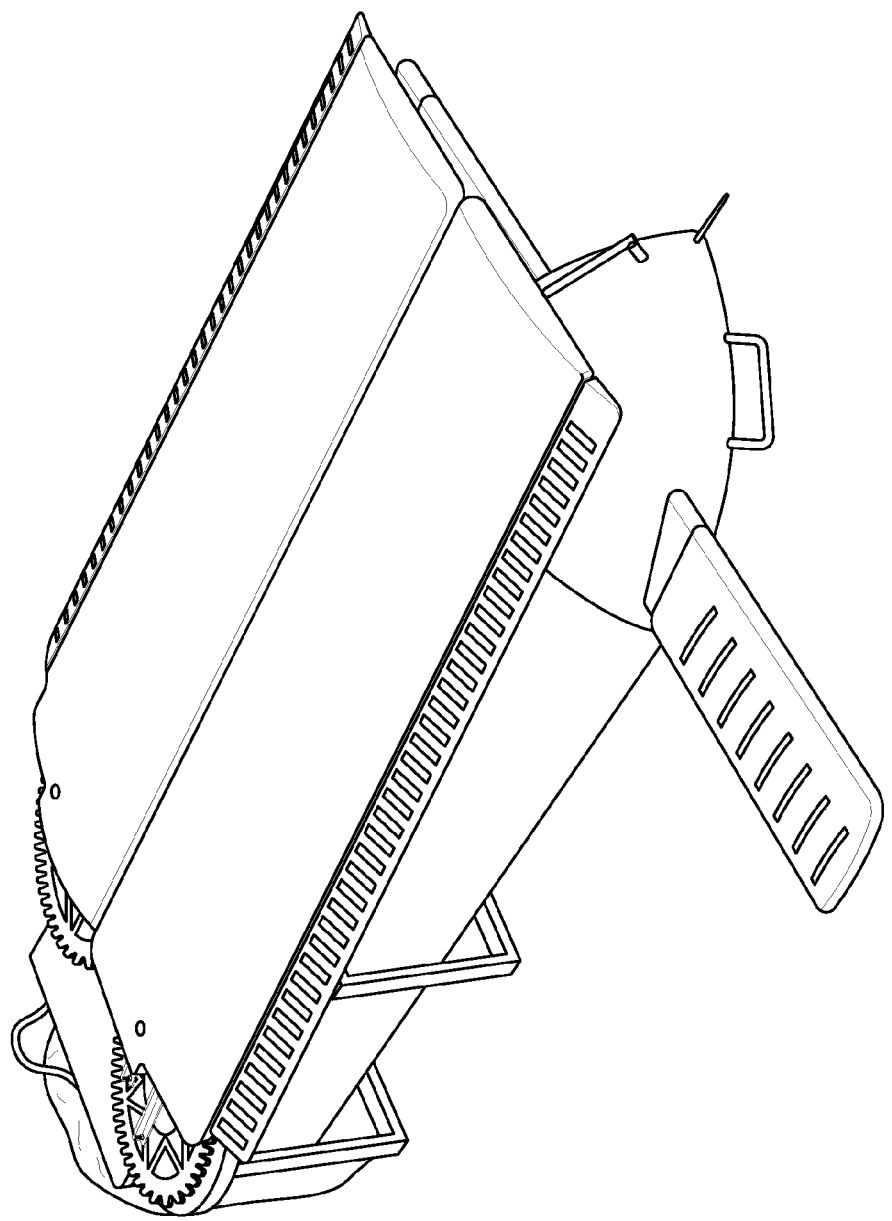
FIG. 4 is an illustrative prototype of an exemplary embodiment of the UAV of the present invention in an exemplary stowed state.
Figure 5:
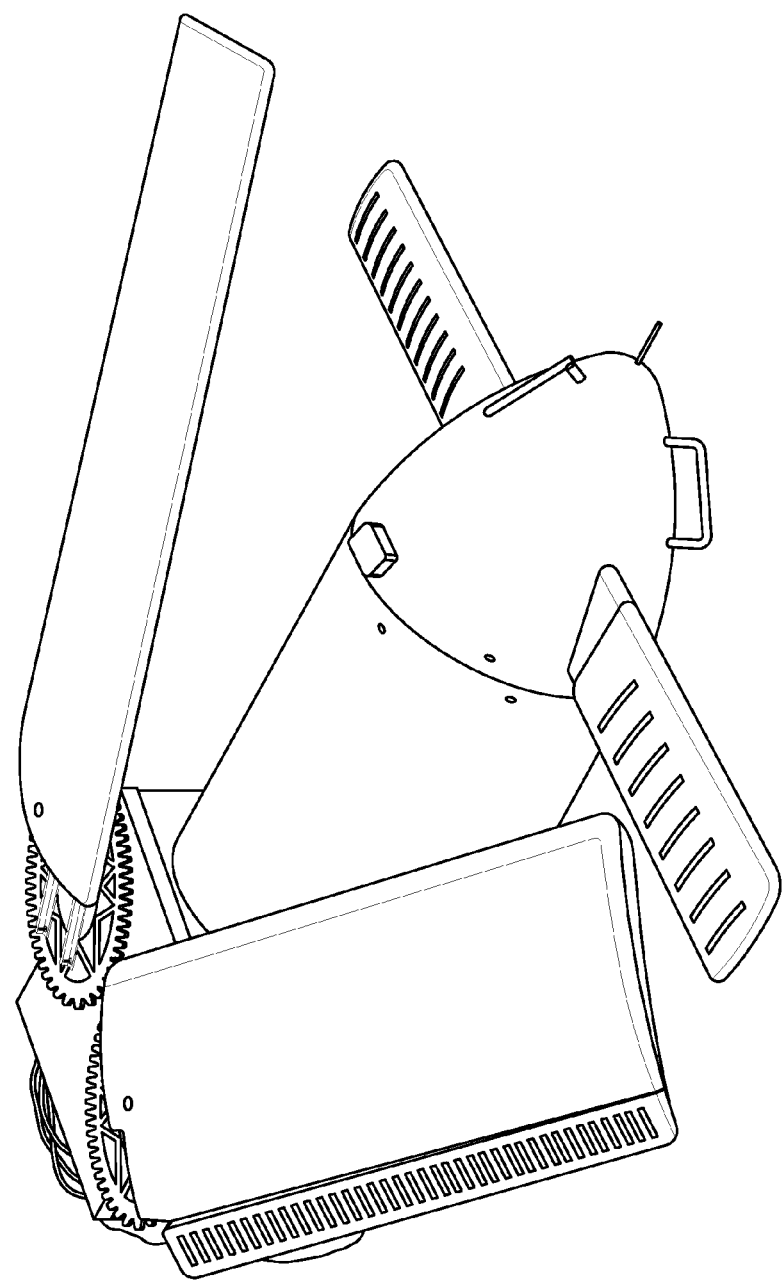
FIG. 5 is an illustrative prototype of an exemplary embodiment of the UAV of the present invention in a partially deployed state.
Figure 6:
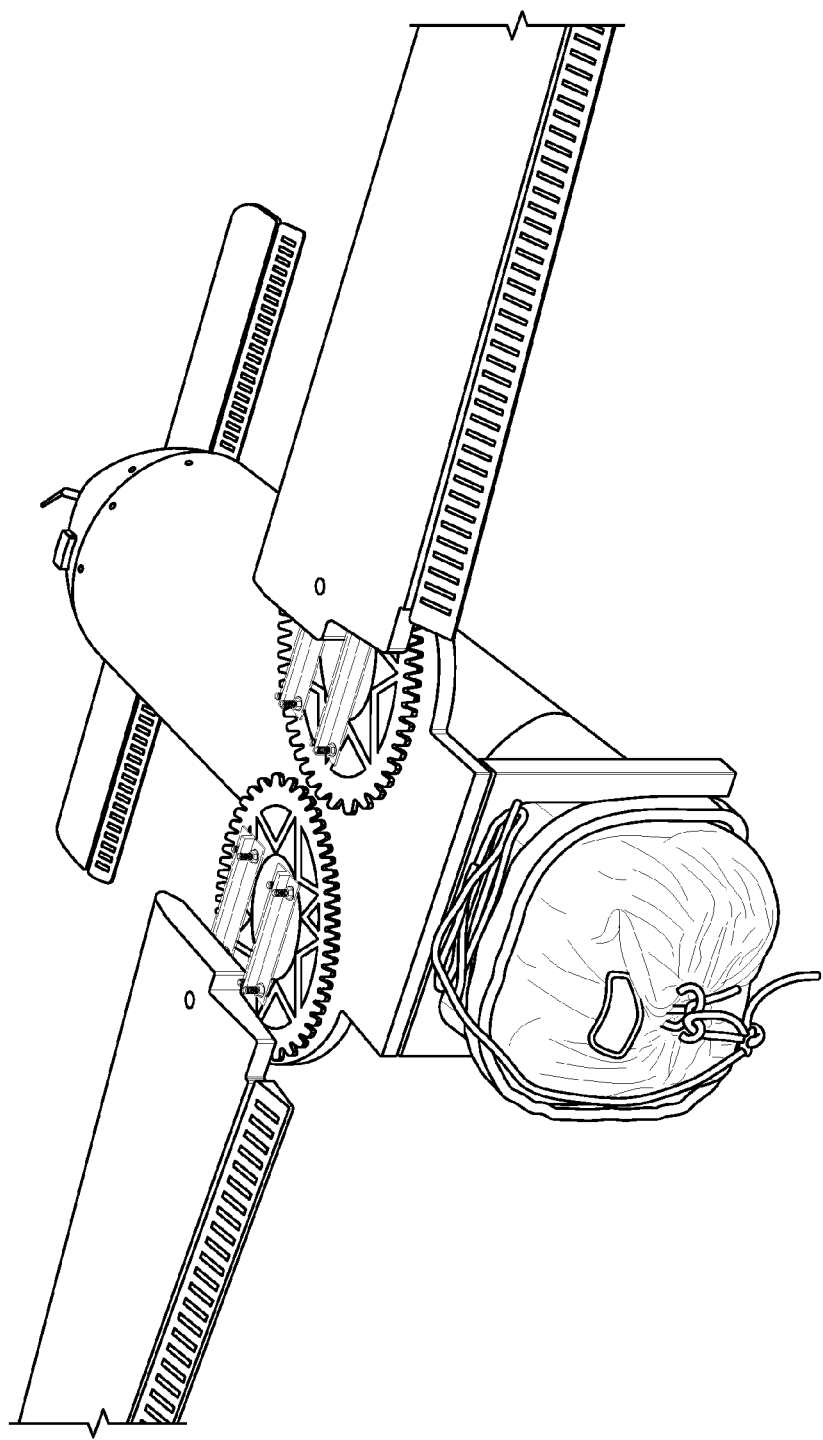
FIG. 6 is an illustrative prototype of an exemplary embodiment of the UAV of the present invention in an exemplary fully deployed state showing an alternate static line deployable drogue parachute attached to the rear of the UAV and the exposed wing deployment gears through which a chain passes to move the wings from the stowed to the deployed position by the chain being pulled upon by the drogue chute after being jettisoned from the mothership at a predetermined altitude.

FIGS. 2, 5 and 6 show embodiments in which the movable wings are set in deployed state and partially deployed state. In this exemplary embodiment, the wings can be positioned substantially perpendicular to the fuselage as illustrated. FIGS. 3 and 4 instead show exemplary embodiments in which the wings are in a stowed position. In this exemplary embodiment the wings can be positioned substantially longitudinally aligned with the fuselage as illustrated.

In exemplary embodiments, the movable wing mechanism can include a set of gears that can be used to rotate or fold the one or more wings. For example, the gears may include one or more toothed round gears. The gears can include sprockets. The gears can include chains or cables. In an exemplary embodiments, the gears include a chain and sprockets. The gears can be attached to the one or more wings of the main wing system. The gears may be arranged so as to operate at the same time thus resulting in the simultaneous rotation of the one or more wings of the main wing system. In an exemplary embodiment, the set of gears includes two main toothed gears, each gear connected to a wing. As each gear is rotated the wing attached thereto also rotates between a stowed position and a deployed position.

The gears can be triggered into motion in a variety of manners. In exemplary embodiments, the gears can be triggered mechanically. In alternative embodiments the gears can be triggered electronically. In other embodiments the gears can be triggered magnetically. The triggering can be done through direct connection. In alternative embodiments, the triggering can also be done wirelessly. For example the triggering can be done by remote control. In alternative embodiments the triggering can be accomplished automatically based on a set of predetermined conditions. For example, a sensor may be provided on the UAV that upon its sensing that the UAV has been launched it automatically signals the triggering mechanism to deploy the wings of the main wing system.

In exemplary embodiments, the gears can be triggered to deploy the wings of the main wing system by way of a parachute pull. In such exemplary embodiments, the UAV can be equipped with a drogue parachute that can deploy after the UAV has been launched or jettisoned. In exemplary embodiments the drogue parachute can be a 10 ft canopy drogue parachute. As the parachute opens, it can be designed to pull on the gear mechanism causing setting it into motion and thus deploy the wings of the main wing system. For example, the drogue parachute can pull on a chain or cable attached to the gears or sprockets to pull the wings into the deployed position. The system can further be design to dislodge the parachute once the gear system has been triggered to deploy the wings of the main wing system. For example, the chain pulled by the drogue parachute can be designed to reach its last tooth on the sprocket or gear system once the wings have been deployed, thus resulting in the chain, and consequently the drogue parachute, separating from UAV once the wings have been deployed. A cable system can be similarly be designed. Alternatively, the gears or sprockets can be designed to pinch and cut the cable loose once the wings have been deployed, thus separating the parachute from the UAV. The parachute in this exemplary embodiment can be stored anywhere on the UAV that can accomplish the triggering goal without interfering with the operation of the UAV. In exemplary embodiments, the parachute is located on the rear of the UAV. In exemplary embodiments, the parachute is provided as described in more detail below in conjunction with the description of the sealed end or detachable cap.

In exemplary embodiments, the gears are designed to lock into position once the wings have been moved into the desired position. For example, the gears can lock into position after the wings have been rotated from a stowed position to a deployed position. The locking of the gear can be accomplished mechanically. For example, the gears can be locked using a rachet, a spring actuated shaft or similar mechanism. In exemplary embodiments, the locking mechanism permanently locks the gears in place. In alternative embodiments, the locking mechanism can be dislodged. The locking mechanism can be operated manually, mechanically, electronically, or magnetically.

In exemplary embodiments, the main wing system may be designed to engage with the fuselage by way of a securing bracket. In alternative embodiments, as described later, the main wing system may be engaged with the fuselage with belts. In alternative embodiments, the main wing system can include a cargo hold 104 to improve structural integrity. The cargo hold can be fixed to the main wing system by way of brackets, bolts or like structure. In an exemplary embodiment the cargo hold can also be fixed to the main wing system by straps. The design of the cargo hold is not particularly limited. In exemplary embodiments the cargo hold is designed to mimic the shape of the fuselage. The cargo hold can be designed to engage the fuselage so that the fuselage can be securely connected to the cargo hold and thus the main wing system. The cargo hold can be hollow to allow for additional storage of supply. In exemplary embodiments, the cargo hold can be designed to constitute an extension of the fuselage. In alternative embodiments, the cargo hold can provide a compartment that is separate from the fuselage. The cargo hold can be designed similar to the fuselage discussed previously. Like the fuselage, the cargo hold may include insulation, padding, and/or impact foam. The cargo hold can include a temperature controlled system. The cargo hold may also include electronics such as GPS, flight control system, communication system, power or battery system and the like.

The cargo hold and fuselage may be able to engage using a variety of methods. In exemplary embodiments the cargo hold can be designed to engage the fuselage using one or more clamps. In alternative embodiments, the fuselage and cargo hold can be engaged by way of push-to-connect fitting. In alternative embodiments, the connection between the fuselage and the cargo hold can be achieved using bolts. In alternative embodiments the fuselage and cargo hold can be engaged by a tight fitting design in which a portion of either the fuselage or cargo hold fits inside a portion of the other. In alternative embodiments, the cargo hold and fuselage can be engaged using straps. Any combination of the above fastening mechanisms may also be employed. In exemplary embodiments, when connected the fuselage and cargo hold can form a sealed or air tight connection. In exemplary embodiments, a fitting 105, such as rubber or metal, can be employed to either secure, seal or make the connection between the fuselage and cargo hold air tight.

Connecting and disconnecting the fuselage from the cargo hold can be accomplished manually or by automation. In exemplary embodiments the connection and disconnection can be performed manually. In alternative embodiment the connection is performed manually and the disconnection can be accomplished automatically via remote control or by a trigger system set to disconnect the fuselage based on a predetermined conditions. For example, time, landing status, or by entering a combination through a pad that can be provided on the outside of the fuselage or cargo hold. In alternative embodiments a trigger mechanism may also be deployed using a magnet. The connection and disconnection may be accomplished through a combination of manual and automatic or electronic means such as trigger or like device as described above.

On the opposite side from where the fuselage can be connected, the cargo hold may include either a sealed end or a detachable cap. In embodiments without a cargo hold, i.e. where the fuselage is connected to the main sing system only by way of brackets, frames and/or clamps, the sealed end or detachable cap described herein can be connected directly to the fuselage in the same manner described herein with respect to the cargo hold. In exemplary embodiments, the cargo hold may include a sealed end that cannot be accessed. In the alternative the sealed end may be equipped with an access door or hatch. In alternative embodiments, the cargo hold may include a detachable cap 106. The sealed end or detachable cap 106 can be made of the same material as the cargo hold. In alternative embodiments, the sealed end or detachable cap 106 can be made of the same material as the fuselage. In alternative embodiments the sealed end or detachable cap 106 can be made of a material that is different from that of the cargo hold. Still, any material used for the cargo hold can be used for the sealed end or detachable cap. Exemplary materials include, but are not limited to, metal, plastic, fiberglass and wood. In a preferred embodiment the sealed end or detachable cap 106 is made of aluminum.

The design of the sealed end or detachable cap should not be viewed as limited. In exemplary embodiments the sealed end or detachable cap is rounded. In alternative embodiments, the sealed end or detachable cap is squared, rectangular or of an irregular shape. In preferred embodiments, the sealed end or detachable cap will have an aerodynamic design.

The sealed end or detachable cap 106 can provide additional padding or crush foam. In the alternative the sealed end or detachable cap can provide additional storage room. In exemplary embodiments the sealed end or detachable cap can be designed to provide a contiguous storage compartment with the cargo hold or fuselage. In alternative embodiments, the sealed end or detachable cap can provide a separate storage department. Like the cargo hold and fuselage, the sealed end or detachable cap can include insulation, temperature controlled systems, and the like. The sealed end or detachable cap may also be designed to carry liquids, chemicals and/or hazardous materials. A separate storage department may be accessed by a separate access door located on the sealed end or detachable cap. If a detachable cap is used, then the compartment may be accessed by detaching the cap from the cargo hold. In exemplary embodiments, the detachable cap or an access door provided on the sealed end can be used to access the storage box located inside the fuselage. In such an embodiment, the storage box can slide out from the fuselage and, if one is present, through the cargo hold and out the back end for easy extraction of the storage box from the UAV. In exemplary embodiments, the sealed end or detachable cap can provide storage for control equipment of the UAV. For example, the sealed end or detachable cap can be used to store a GPS system, controller, one or more transmitters, memory, battery or other power source.

In exemplary embodiments where a detachable cap is used instead of a sealed end, various designs may be employed to secure the detachable cap to the cargo hold or fuselage. Any of the methods described previously with respect to the connection between the cargo hold the fuselage can similarly be implemented in the connection between the cargo hold or fuselage and the detachable end cap.

In alternative embodiments, instead of a detachable cap or sealed end, the end portion of the fuselage or the side distal to the fuselage of the cargo hold may be equipped with a pouch as shown, for example, in FIG. 6. In yet alternative embodiments, the fuselage or the cargo hold can include a combination of the sealed end and a pouch. In the alternative, the fuselage or the cargo hold can include a detachable cap and a pouch. In this latter embodiments, the pouch may be positioned such that the detachable cap covers and encloses the pouch when the detachable cap is engaged with the fuselage or the cargo hold. In exemplary embodiments, the pouch may be provided on the outside of the detachable cap.

The pouch may be made of fabric or likewise soft material. It can be used for additional storage. In exemplary embodiments the pouch may also be used to contain a parachute. The parachute can be equipped with the necessary trigger mechanism to either automatically deploy under a given condition. The given condition may be a predetermined altitude. In the alternative, the trigger may deploy the parachute at a given time. The given condition may also be in response to a sensor located on the UAV. For example, if an altimeter records a drastic drop in altitude that may be indicative of a malfunction of the UAV. Any other like sensor that would also indicate any malfunction of the UAV. The parachute may also be equipped with a remotely controlled trigger such as an electromechanical solenoid or actuator. Solenoids and actuators are well known in the art and thus will not be described further herein. In exemplary embodiments in which the sealed end or detachable cap encloses the pouch, a trigger mechanism for a parachute may be also coupled to an access door located in the sealed end or detachable cap. Alternatively, the trigger mechanism may detach the detachable cap leaving the pouch exposed and allowing the parachute to deploy. In alternative embodiments, no pouch is used and the parachute is stored in the sealed end or detachable cap and deployed by a trigger mechanism as discussed herein either by way of an escape hatch or by the disconnection of the detachable cap.

At the front end of the fuselage, i.e. opposite from the end where fuselage attaches to the main wing system and/or cargo hold, is a nose cone 103. The nose cone 103 is illustrated in the shape of a cone, however, this shape is not limited. Notwithstanding the nomenclature used herein, the nose cone can be in a shape other than a cone. In exemplary embodiments the nose cone has a generally circular cross section with a convex, rounded front end. Alternatively, the nose cone can have a flat front end. Exemplary embodiments may include a nose cone with a concave front end. Also, the nose cone can have a non-circular cross-section. For example, the nose cone could have a square, rectangular or irregularly shaped cross section. Preferred embodiments include a nose cone that has an aerodynamic shape. In exemplary embodiments, the cross-sectional shape of the nose cone will mimic the cross-sectional shape of the fuselage. In alternative embodiments, the nose cone will have a different cross-sectional shape that is different from the cross-sectional shape of the fuselage.

The nose cone can be integral to the fuselage or be detachable. In exemplary embodiments where the nose cone is integral to the fuselage, the nose cone constitutes the front end of the fuselage and can be formed either of a contiguous material as the fuselage or can be separately manufactured but permanently attached to the fuselage. In alternative embodiments, the nose cone can be designed to be detachable from the fuselage. The nose cone can be made of any material used to form the fuselage. For example, the nose cone can be metal, wood, fiberglass, or plastic. In exemplary embodiments the nose cone is made of aluminum. The nose cone can be made to match the material as the fuselage. In alternative embodiments, the nose cone is made of a material that is different from that of the fuselage. The nose cone can be affixed to the fuselage in the same manner as the fuselage can be connected to the cargo hold. Likewise, a detachable nose cone can be similarly detached from the fuselage in any of the previously described manners in which the fuselage can be detached from the cargo hold either manually or by automation or remote control.

The nose cone can provide additional storage capacity. In exemplary embodiments, the nose cone can provide a storage space separate from that of the fuselage. In alternative embodiments, the nose cone can provide a storage space that is contiguous to that of the fuselage. The nose cone can also be equipped with an access door or be detachable from the fuselage so as to provide access to a storage box located inside the fuselage. In this manner the storage box can be easily removed from the fuselage from the front of the UAV. The nose cone can also be used to store electronics components to the UAV such as GPS, controllers, one or more transmitters, memory, power sources such as batteries and the like. In an exemplary embodiment, the nose cone is used to carry the controllers, GPS, one or more transmitters, a memory, and one or more power sources for the UAV. In exemplary embodiments, the nose cone can be designed to bear the impact of landing by including padding or crush foam sufficient to protect the supplies stored in the fuselage or elsewhere in the rest of the UAV.

The nose cone can optionally be equipped with canard wing system 107. The canard wing system can include one or more canard wings. The canard wings can be made of the same materials and designed as the wings of the main wing system. In exemplary embodiments, the canard wings are smaller than the wings of the main wing system. In a preferred embodiment the canard wings are shortened for packaging and the airfoil can articulate as a stabilizer for required authority in pitch control. Like the wings of the main wing system, the canard wings can also be equipped with ailerons, spoilers and/or flaps. The ailerons, spoilers and/or flaps can be controlled using actuators as similarly described above with respect to the main wing system. In exemplary embodiments the canard wings are equipped with ailerons. Ailerons can help control the flight of the UAV without a vertical stabilizer or rudder. In exemplary embodiments, unlike the wings of the main wing system, the canard wings have a fixed position. The canard wings can also be configured to control pitch. The canard wings can be configured to control roll. The canard wings can also be configured to control yaw.

In exemplary embodiments, the UAV can be equipped with a triggering mechanism that causes one or more of the above parts to automatically disengage under a given set of conditions. For example, the parts may disengage based on the location of the UAV that can be tracked by GPS and/or altimeter. In a simplified embodiment, the trigger may be activated in response to an altimeter reading. When the UAV is at a predetermined height from the ground, which can range from being on the ground, to a few feet from the ground or a much higher altitude, a signal is sent to the trigger mechanism. The trigger can then cause any one or more of the fastening elements between fuselage, cargo hold, nose cone, main wings, end cap and canard wings to disengage. For example, based on whether the UAV is on the ground or a predetermined height, the trigger mechanism can send a signal to each of the desired fastening elements to disengage. In exemplary embodiments, the system is designed to disengage sufficient fastening elements to allow for easier transportation of the UAV, for example by separating the wings. In alternative embodiments, sufficient fastening elements can be disengaged to provide easy access to the cargo inside the UAV. In yet another embodiment, the fastening elements can be designed to disengage or become loose upon the UAV's impact with the ground. Remote control, location determined by way to for example GPS, or other triggering devices as described throughout this specification can also be used to loosen, disconnect, or otherwise separate the fastening elements.

The UAV can include a guidance system. In exemplary embodiments, the guidance system can be an on-board autonomous system. Alternatively, the guidance system can be controlled via remote control. For example, the UAV may include a radio controlled guidance system. In exemplary embodiments, the UAV may include a combination of remote controlled and autonomous guidance system. In one embodiment, the UAV can include an on-board autonomous guidance system that can a user can override via radio control. Such autonomous control systems typically comprise hardware and software elements. The hardware of such systems is becoming known in the art of UAV guidance such as manufactured by 3D Robotics of San Diego, Calif. Autonomous control software is becoming known in the art of UAV guidance and may be installed as firmware on various hardware platforms. One example of autonomous UAV firmware is APM:Plane provided by 3D Robotics, which is open source and thus can be easily customized for different unmanned aircraft configurations and missions. A mission planning software tool may be used to pre-program the autonomous autopilot with coordinates and altitudes for a particular mission. One example of such mission planning software is Mission Planner Ground Control Station software provided by 3D Robotics.

An on-board autonomous guidance system may include autopilot flight controls. The on-board autonomous guidance system can receive information regarding the jettison or deployment location, the altitude at which the UAV is jettisoned, and the intended landing location. In addition to the location, the information may also include the altitude of the landing location. The landing altitude, however, is not strictly needed since it can also be determined from a terrain database or determined by an onboard ground proximity sensing system such as a remote sensing technology that measures distance by illuminating a target with a laser and analyzing the reflected light, for example a Light Detection and Ranging system (LIDAR), laser altimeter, range finder, sonar sensor, infrared sensor, or a length of wire hanging below the fuselage of the UAV during flight with a sensor at the distal end of the wire configured to make first contact with the ground and transmit a triggering signal.

The information can be uploaded prior to jettisoning the UAV. In exemplary embodiments, the information may be uploaded by way of wireless telemetry, USB cable, Ethernet cable, fiberoptic cable, radio transmission, wi-fi connection, or by physical connection or insertion of a memory device in or to the UAV. Alternatively, the information may be provided or updated during deployment of the UAV, i.e. after the UAV has been jettisoned. Any suitable wireless communication can be used to transmit the data to the UAV guidance system whether it is to actively control the UAV or to feed information to the on-board autonomous guidance control system. In alternative embodiments, the on-board autonomous guidance system can be designed to determine the location and altitude of the UAV autonomously. In such exemplary embodiment, the only information to feed to the on-board autonomous guidance system is the landing location. In addition to the landing location, the information may also include the altitude of the landing location. Although, the altitude of the landing location can be also determined through other means described above, such as ground proximity sensing system or a terrain database. This information can be provided either before or after the UAV is jettisoned. The information fed to the on-board autonomous guidance system can be provided either by an operator or by a main frame or separate controller unit. Information about weather conditions including, for example, wind speed and wind direction can also be provided or sensed in real-time by on-board sensors such as an airspeed sensor compared to a second velocity sensor such as GPS with a function of the difference in speed measurements representing the approximate winds aloft direction and velocity.

The guidance control system of exemplary UAVs may include global position system (GPS) waypoint navigation. The control system may include inertial measurement units that provide attitude information for aircraft, including heading, pitch, yaw, and roll. Exemplary embodiments include mechanical gyroscopic flight instruments. Preferred embodiments include an attitude and heading reference system (AHRS). AHRS can include either solid-state or microelectromechanical systems (MEMS) gyroscopes, accelerometers and magnetometers on all three axes. In exemplary embodiments, the guidance control system can include 6 degrees of freedom (DOF) AHRS. The guidance control system can also include a pitot-static system that can be used to determine an aircraft's airspeed, Mach number, altitude, and altitude trend. The guidance control system can also include a magnetic compass. The control system can include a barometric pressure altimeter. As described earlier, the control system can include a LIDAR laser altimeter. The control system can also include customizable autoland routines. The control system can also include an automatic stall prevention code. The control system can further include differential aileron algorithms. The control system can include failsafe modes. The control system can also include user configurable firmware. The control system can further be equipped with mission planning software.

The UAV can be jettisoned or deployed from either a stationary base or a moving craft. In exemplary embodiments, the UAV can be jettisoned or deployed from a moving aircraft (mothership). The mothership can be any aircraft that is capable of carrying and jettisoning the UAV. The mothership can be a manned aircraft. Alternatively, the mothership can itself be an unmanned aircraft. As an unmanned aircraft the mothership can either have its own autopilot or autonomous flight control system, or it can be controlled remotely. In exemplary embodiments, the mothership may be a combination of manned and unmanned type of aircraft and autonomous and remotely controlled aircraft. In an exemplary embodiment, the mothership can be a C-130 aircraft. Although other similar aircrafts can also be used. For example, CH-53 or MV-22 or any like aircraft. The UAV can be carried inside the mothership, for example in the cargo bay. In alternative embodiments, the UAV can be carried outside the mothership such as in a slingload configuration underneath a mothership such as a helicopter. The operator of the mothership can cause the slingload to release the UAV at a location and altitude where jettisoning is desirable. The slingload may comprise a cable or a net to hold the UAV. The cable may be released to jettison the UAV. In the case of a cargo net, the net may be released partially or completely from the mothership to cause the UAV to separate and fall away from the mothership at a predetermined location. In alternative embodiments, the UAV can be placed inside a tube inside or external to the mothership that acts to keep the wings of the main wing system folded and once ejected from the tube at the jettison location, the wings of the main wing system can have a spring loaded deployment feature that causes the wings of the main wing system to rotate into a locking position once free of the deployment tube.

In exemplary embodiments, the UAV described herein are expendable UAV (EUAV). EUAV can be designed for single deployment and can be produced very cost effectively.

In an exemplary embodiment, the EUAV can be loaded with up to 700 lbs of supply. The EUAV can include the payload contained in a 2 ft×2 ft×6 ft space in the fuselage. The main wing airfoil can be a NACA 4309 with a 3 ft chord. At full gross weight, the glide ration can be 12:1 and give a standoff distance of 24-49 miles when jettisoned at altitudes of 12,000 and 25,000 feet, respectively.

Exemplary embodiments include a cargo case space in the fuselage that makes loading and unloading easy and can be well protected during landing by a 5 ft long crumple zone with high impact foam. Such cargo cases are manufactured by Pelican Products Inc. of Torrance, Calif. The fuselage can also include provisions on its underbelly for forklift skids as well as numerous lifting eyes and cargo rings to provide for secure airborne transport to the drop zone. In exemplary embodiments the airframe can weigh 250 lbs, plus 50 lbs. for the fuselage and impact foam, that together with a 700 lb supply load results in a max gross weight of 1,000 lbs.

In exemplary embodiments, the max gross best glide speed can be 86 knots with a sink rate of 15 fps (900 fpm), which can be reduced to 0 fps/fpm during the full stall landing. Autonomous flight can be accomplished by a modified COTS fixed-wing autopilot. The landing routine can begin when the on-board LIDAR sensor detects terrain proximity approximately 150 ft AGL and begins slowing the EUAV craft, ultimately commanding all ailerons (preferably 4) and stabilators (preferably 2) to their full down positions to act as spoiler/flaps followed by a pitch-up, full stall landing within 100 ft of the intended drop zone. The EUAV can achieve a vertical sink rate of 0 fpm at the point of touchdown.

Figure 8:
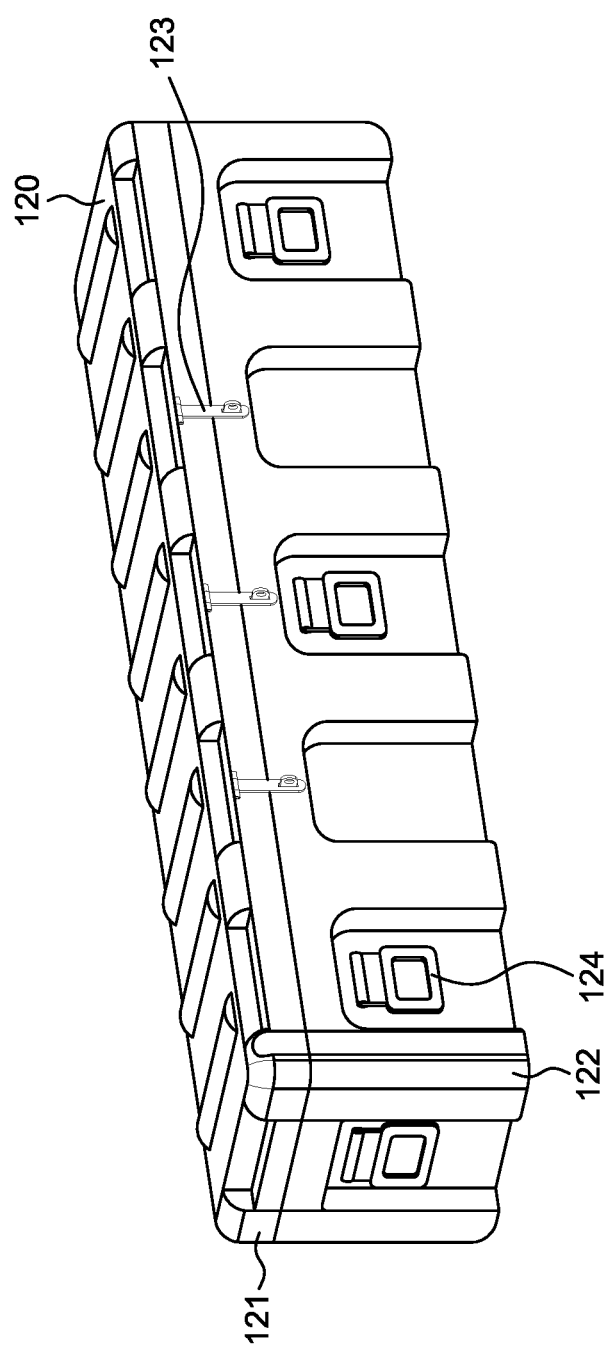
FIG. 8 is an exemplary embodiment of a fuselage cargo container for use with the present invention.

As mentioned above, a cargo container such as those manufactured by Pelican Products, Inc. may be used to contain and protect the cargo. In an exemplary embodiment, the cargo container itself may form the fuselage of the UAV or EUAV. FIG. 8 is an exemplary embodiment of a cargo container 120 for use with the present invention. The fuselage cargo container may have a lid 121 and a bottom portion 122. It may have latches 123 to secure the lid to the bottom portion and one or more handles 124 to facilitate the carrying of the fuselage cargo container. The fuselage cargo container may be manufactured from rigid plastic materials such as fiberglass reinforced polypropylene copolymer or other strong, moldable plastics or resins. Additionally, it may be made of a biodegradable material such as wood or wood composite or wood laminate.

Figure 9:
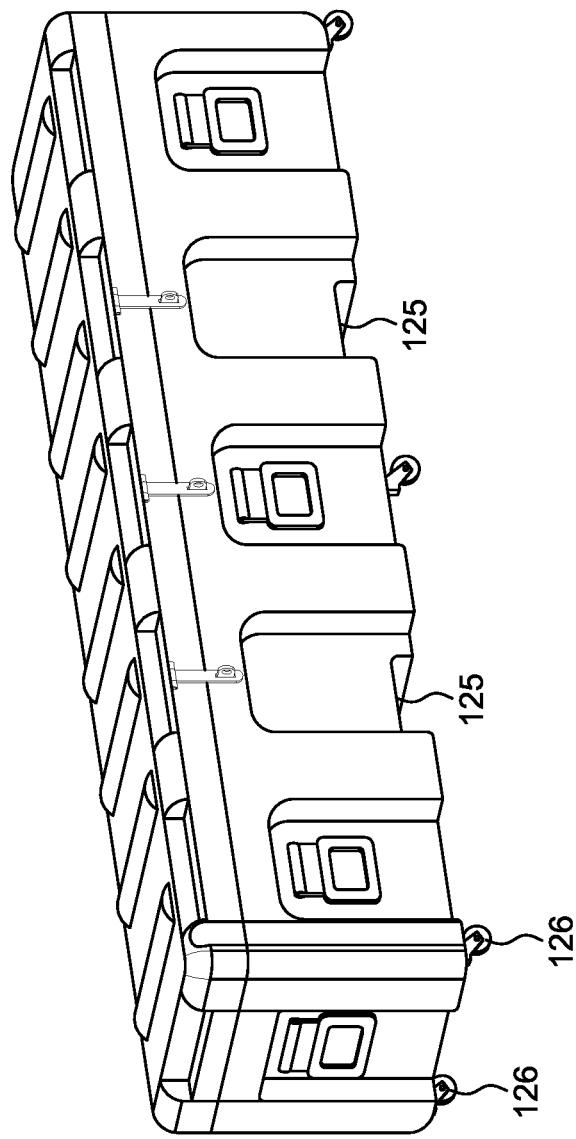
FIG. 9 is an exemplary embodiment of a fuselage cargo container for use with the present invention having provisions for forklift skids and caster wheels.

FIG. 9 is an exemplary embodiment of a fuselage cargo container for use with the present invention having provisions for forklift skids 125 and caster wheels 126.

Figure 7:
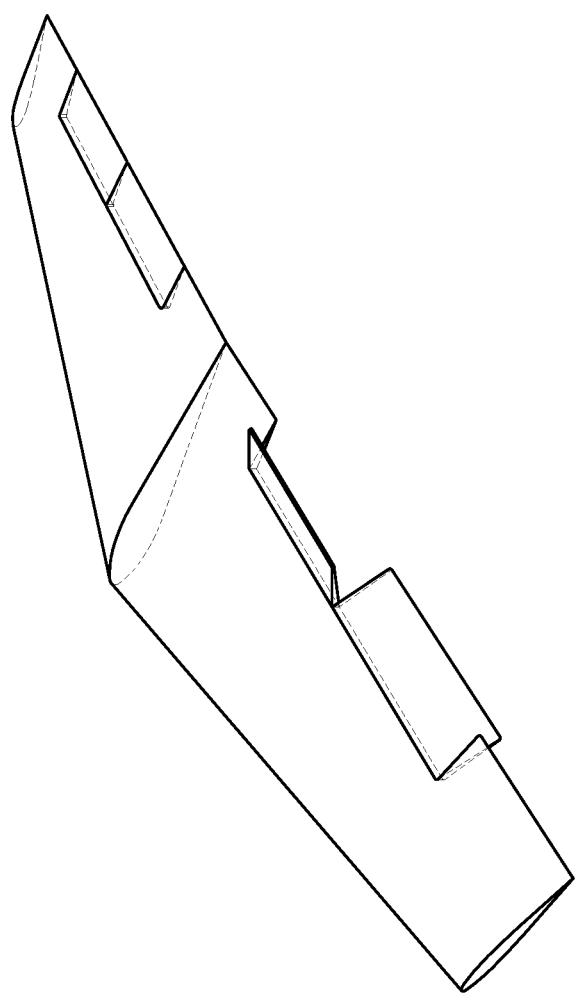
FIG. 7 is a diagram depicting the deflection of differential ailerons on a flying wing configuration showing the independent deflection capability of two ailerons on the same side of the aircraft, which mechanism is used by those skilled in the art of controlling the flight characteristics of aircraft with no vertical stabilizer or rudder to maintain control over yaw during turns.
Figure 10:
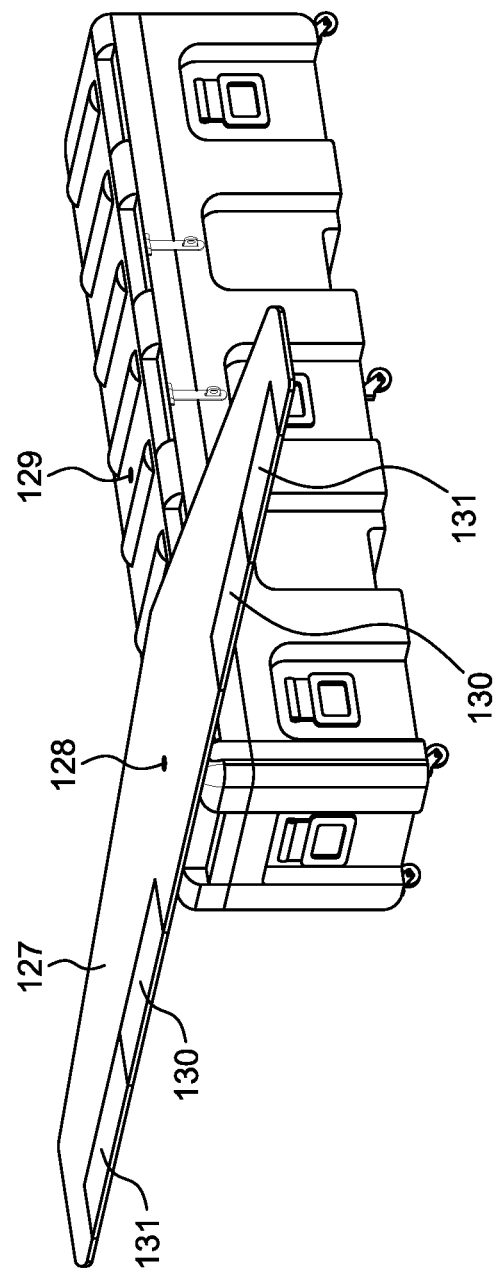
FIG. 10 is an exemplary embodiment of the UAV of the present invention showing a fuselage cargo container acting as the fuselage of the UAV and having a pivoting wing.

FIG. 10 is an exemplary embodiment of the UAV of the present invention showing a fuselage cargo container acting as the fuselage of the UAV and having a centrally pivoting wing 127 with a pivot point 128. The centrally pivoting wing may be manufactured in one piece and pivot through 90 degrees when being deployed from a mothership. The position of the centrally pivoting wing relative to fuselage cargo container in FIG. 10 is to the rear of the container, but it is to be understood that a person practicing the invention could make the position of the wing moveable relative to the container depending on the weight and balance of the cargo load. In one embodiment, the wing could be located at the middle of the container indicated by 129. The wing may have one or more flight control surfaces and in one embodiment, have two inner ailerons 130 and two outer ailerons 131. A variety of flight control strategies may be employed to maintain directional stability and controllability of the UAV such as differential aileron control as previously described with respect to FIG. 7.

Figure 11:
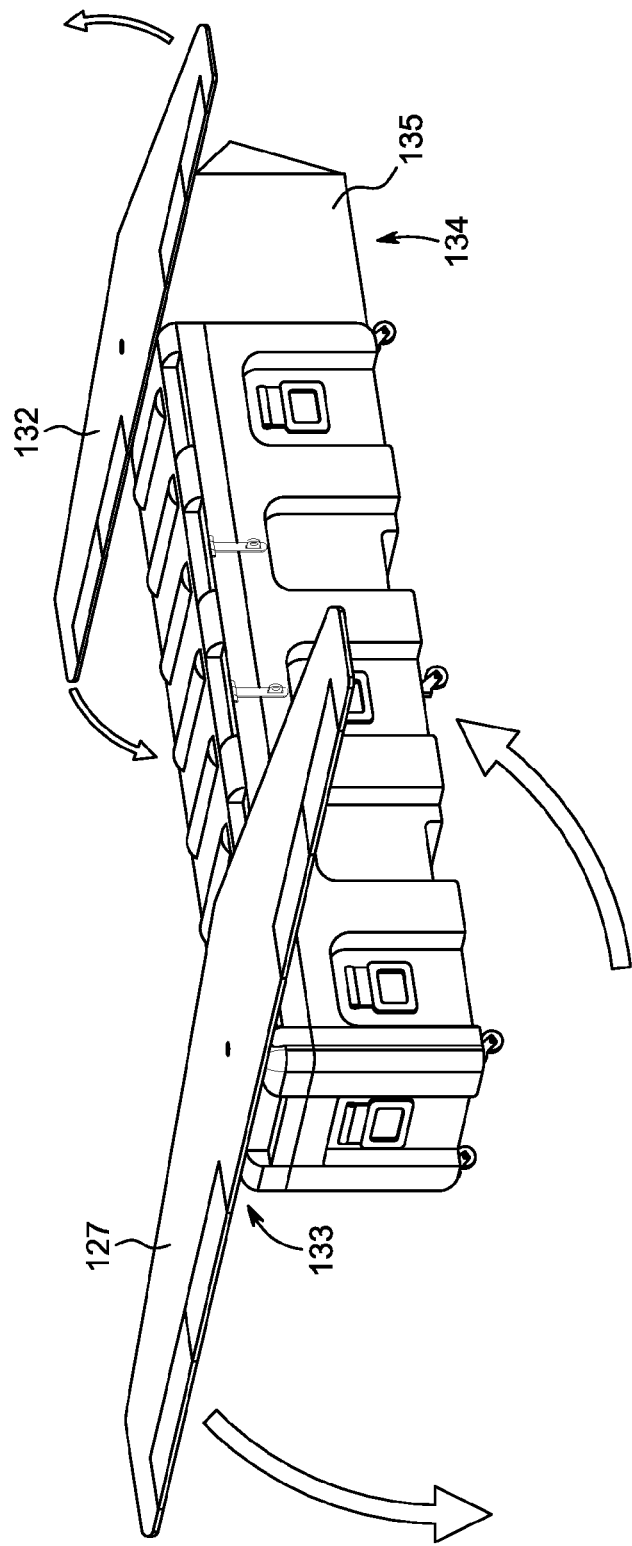
FIG. 11 is an exemplary embodiment of the UAV of the present invention showing a fuselage cargo container acting as the fuselage of the UAV and having a pivoting main wing and a pivoting canard wing.

FIG. 11 is an exemplary embodiment of the UAV of the present invention showing a fuselage cargo container acting as the fuselage of the UAV and having a pivoting main wing and a pivoting canard wing 132. The pivoting action of the main wing and canard wings may be in any direction and number of degrees, and in one embodiment pivot through 90 degrees from a stowed to a deployed position. The main wing and canard wing may be directly attached to the top of the fuselage cargo container as the main wing is depicted in FIG. 11 shown by arrow 133, or in the alternative, either wing may be mounted atop a separate extension portion of the fuselage cargo container as the canard wing is depicted in FIG. 11 shown by arrow 134. In one embodiment, the canard wing is mounted on top of a detachable nose cone 135.

Figure 12:
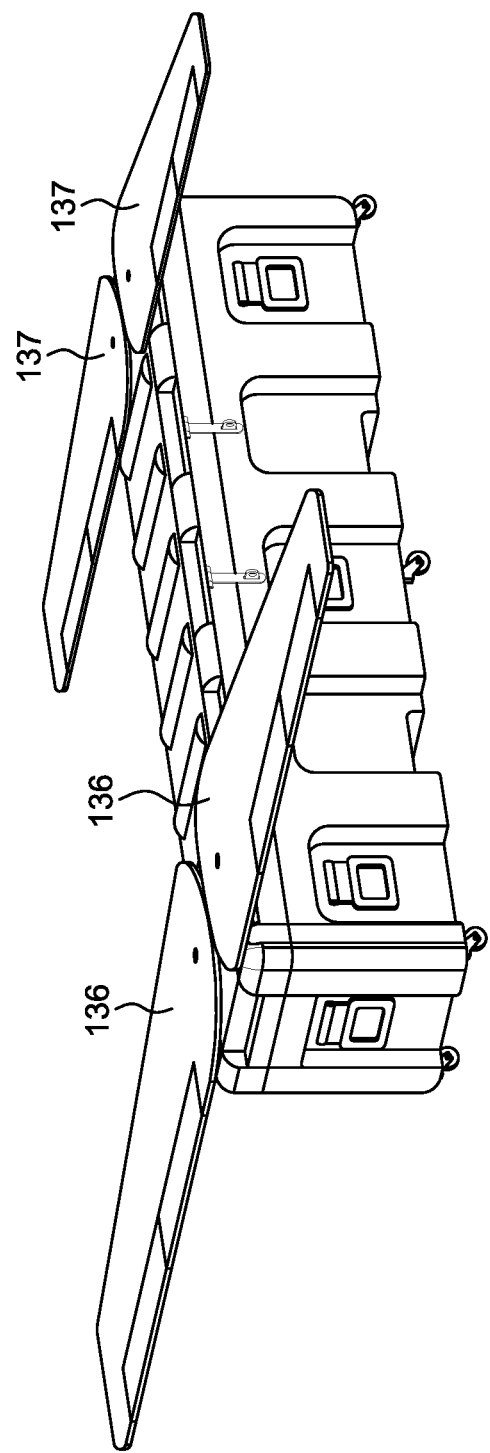
FIG. 12 is an exemplary embodiment of the UAV of the present invention showing a fuselage cargo container acting as the fuselage of the UAV and having two pivoting main wings and two pivoting canard wings.

FIG. 12 is an exemplary embodiment of the UAV of the present invention showing a fuselage cargo container acting as the fuselage of the UAV and having two pivoting main wings 136 and two pivoting canard wings 137.

Figure 13:
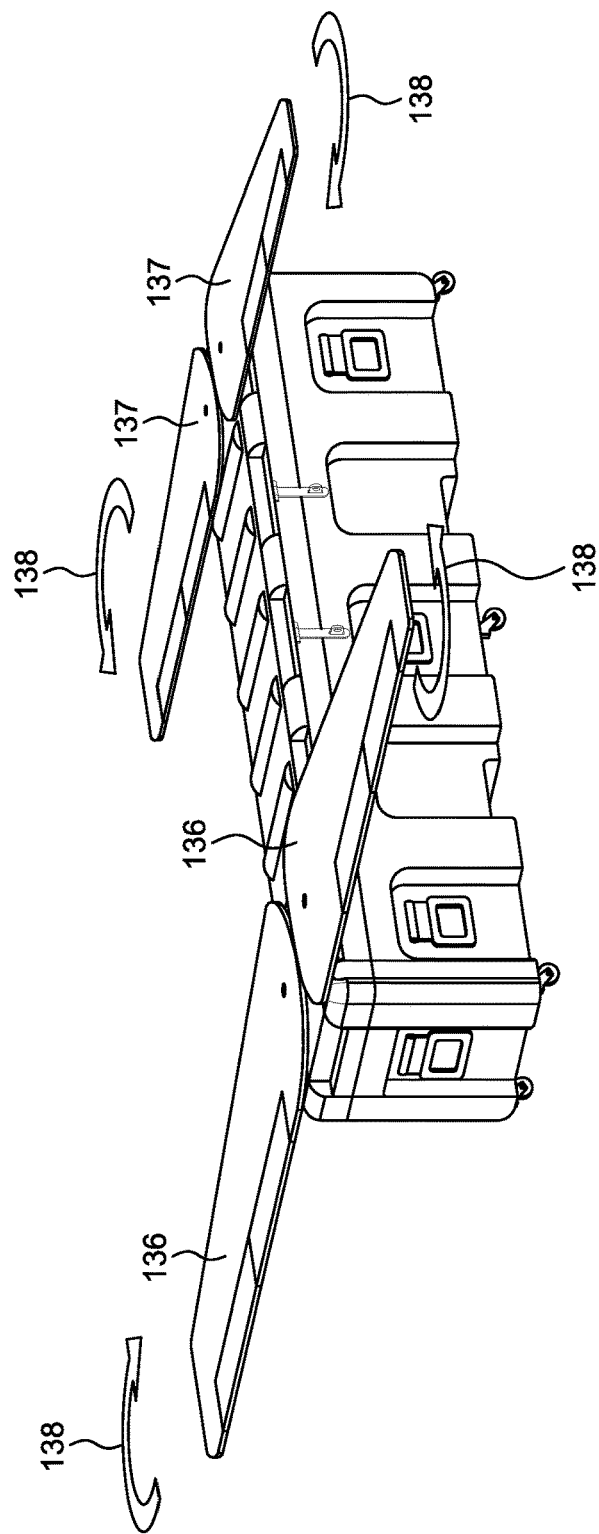
FIG. 13 is an exemplary embodiment of the UAV of the present invention showing a fuselage cargo container acting as the fuselage of the UAV and having two pivoting main wings and two pivoting canard wings with arrows showing the direction of pivot.

FIG. 13 is an exemplary embodiment of the UAV of the present invention showing a fuselage cargo container acting as the fuselage of the UAV and having two pivoting main wings 136 and two pivoting canard wings 137 with arrows 138 showing the direction of pivot. As shown in FIG. 13, one embodiment is for the main wings to pivot 90 degrees towards the center of the fuselage cargo container and canard wings to also pivot 90 degrees towards the center of the fuselage cargo container in order to achieve compactness for transportation aboard a mothership up to the point of being jettisoned.

Figure 14:
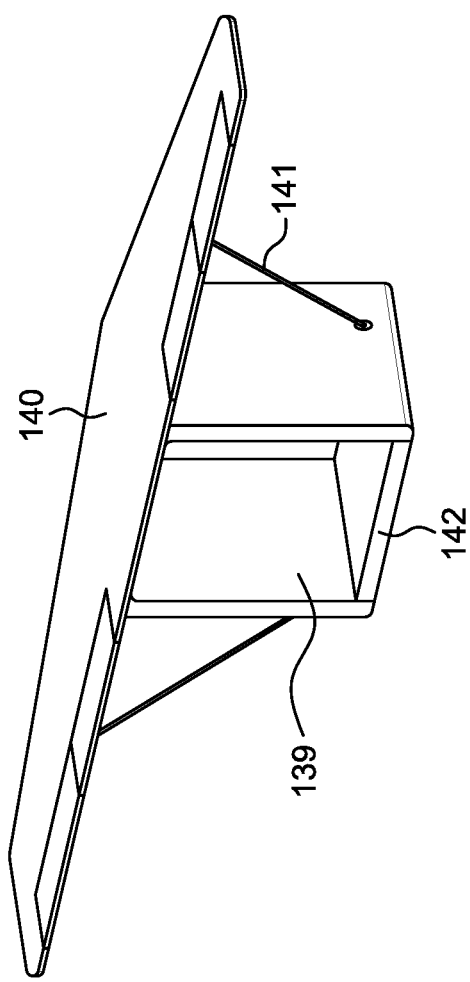
FIG. 14 is an exemplary embodiment of a main wing box and attached main wing with cantilever support structure.

FIG. 14 is an exemplary embodiment of a main wing box 139 and attached main wing 140 with cantilever support structure 141. The cantilever support structure allows the high cantilever loads that a wing of a heavy payload UAV experiences to be transferred to a strong point such as the wing box in order to relieve stress and bending moments that would otherwise be placed upon the wing pivot mechanism, which can therefore be designed to be lightweight and inexpensive. A flexible cable, a solid support strut or a telescoping type of support could all be used by a person practicing the present invention depending on the geometry that the wing defines while going through the motion of pivoting from a stowed position to a deployed position. If the geometry is such that the length of such a support strut would remain constant while pivoting, then a cable, rope or other strong multifilament material is desirable for its combination of cost effectiveness, strength and ease of attaching to the wing box and underside of the wings.

The purpose of the main wing box is to provide a robust structure to circumscribe the outer shape of the fuselage cargo container for the wing(s) to mount to and in certain embodiments to pivot on. The main wing box may have a detachable lower portion 142 for ease of installation around the fuselage cargo container. The detachable lower portion is also used in embodiments where it is desirable to provide for a rapid disconnection of the wing(s) from the fuselage cargo container to aid in the rapid removal of the cargo from the landing zone by the intended recipients. The main wing box may be made of any material a person practicing the invention desires and in one embodiment it may be made of a biodegradable material.

Figure 15:
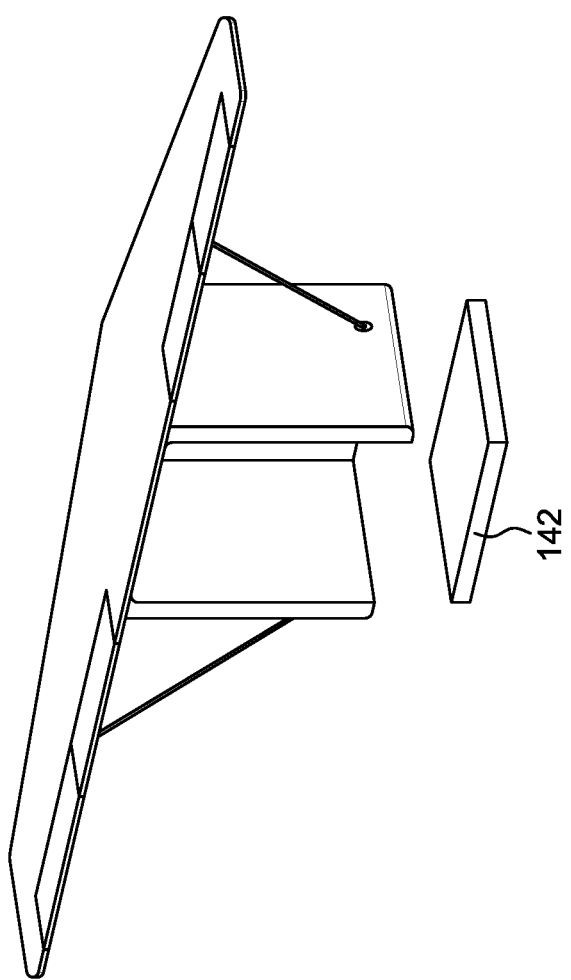
FIG. 15 is an exemplary embodiment of a main wing box and attached main wing with cantilever support structure and a detachable lower portion.

FIG. 15 is an exemplary embodiment of a main wing box and attached main wing with cantilever support structure and a detachable bottom portion 142. As noted above, in some embodiments such as when the present invention is being used to resupply troops in harm's way, it is desirable to have the wings quickly and easily detach in order to facilitate the rapid removal of the fuselage cargo container from the landing zone in order to minimize risk of being detected and engaged by an enemy. The detachable bottom portion that retains the wing box to the fuselage cargo container may be configured to rapidly detach at a precise moment, such as upon initial impact of the UAV with the ground surface of the landing zone. A mechanical or electromechanical device may be used whereby contact with the ground causes the detachable bottom portion of the wing box to detach and separate from the fuselage cargo container during the landing sequence. In that case, the fuselage cargo container would shed all of its wings and other flight control devices while still in motion and would settle and slide to a stop completely ready to be transported away from the landing zone by the intended recipients expeditiously as depicted in FIG. 17.

Figure 16:
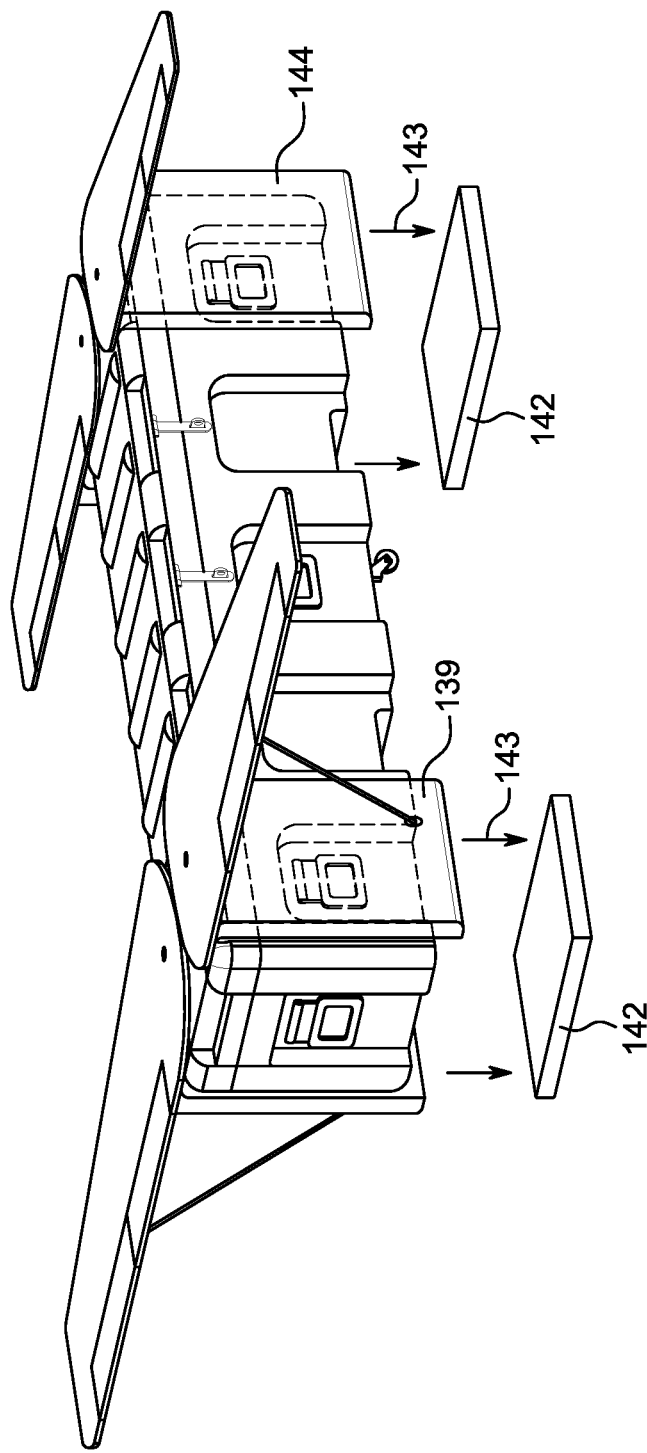
FIG. 16 is an exemplary embodiment of the UAV of the present invention with an attached main wing box with a detachable lower portion and an attached canard wing box with a detachable lower portion.

FIG. 16 is an exemplary embodiment of the UAV of the present invention with an attached main wing box 139 with a detachable lower portion 142 and an attached canard wing box 144 with a corresponding detachable lower portion 142 that can rapidly separate from wing box and canard box as shown by arrows 143. It can be appreciated by a person skilled in the art of the aerial resupply of troops that the ability to quickly attached wings to a cargo container, drop it from a mothership aircraft at a safe standoff distance away from any enemy concentrations, have it precisely land at a predetermined location while simultaneously shedding its wings and slide to a stop ready to be carried away to safety by the intended ground troops can be accomplished by the UAV of FIG. 16 and is an extremely desirable and valuable invention. In one embodiment, the wing(s), wing box, canard wing(s), canard wing box and any other items solely related to flight are left behind at the landing location and are constructed of biodegradable materials.

Figure 17:
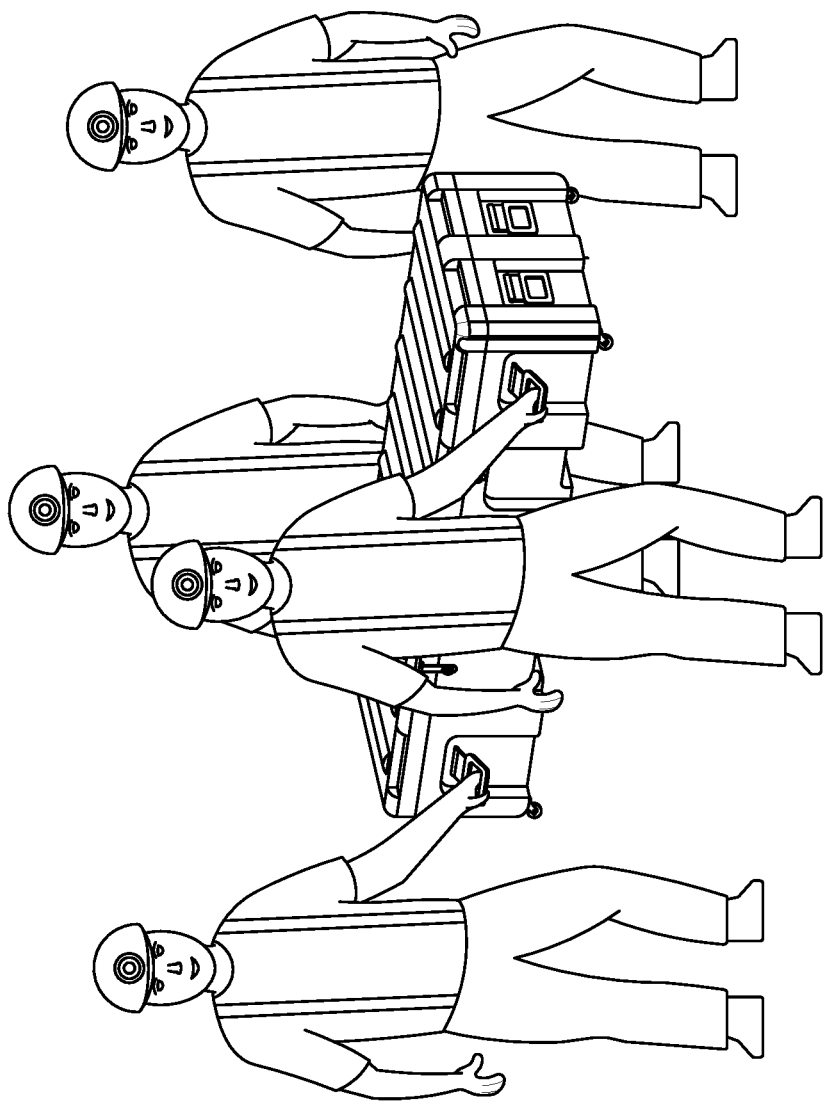
FIG. 17 is an exemplary embodiment of the UAV of the present invention after landing and after the main wing box and canard wing box have been ejected during the landing sequence and showing the recipients of the delivered cargo carrying the fuselage cargo hold portion of the UAV away from the landing site.

FIG. 17 is an exemplary embodiment of the UAV of the present invention after landing and after the main wing box and canard wing box have been detached and separated during the landing sequence and showing the recipients of the delivered cargo carrying the fuselage cargo hold portion of the UAV away from the landing site.

Figure 18:
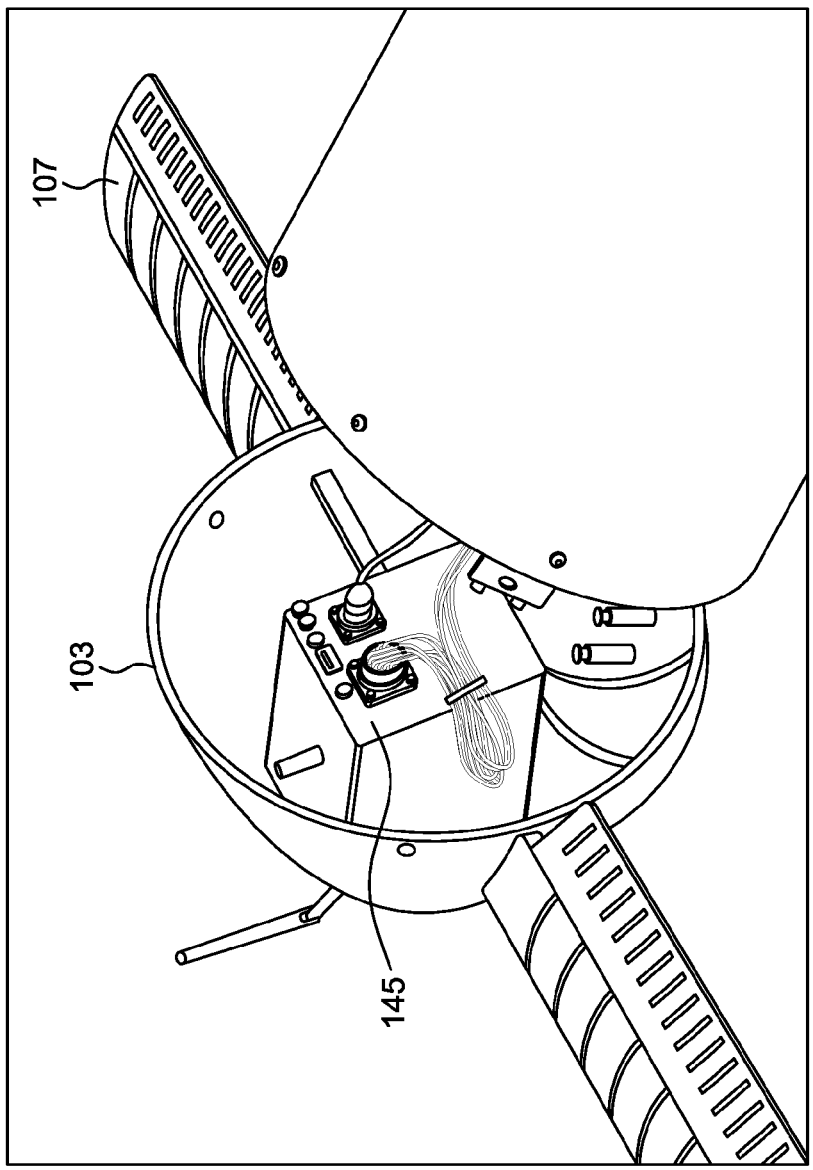
FIG. 18 is an exemplary embodiment of the UAV of the present invention with a removable nose cone having an attached canard wing system and the autopilot guidance and control system located inside the nose cone.

FIG. 18 is an exemplary embodiment of the UAV of the present invention with a removable nose cone 103 having an attached canard wing system 107 and an autopilot guidance and control system 145 located inside the nose cone.

Figure 19:
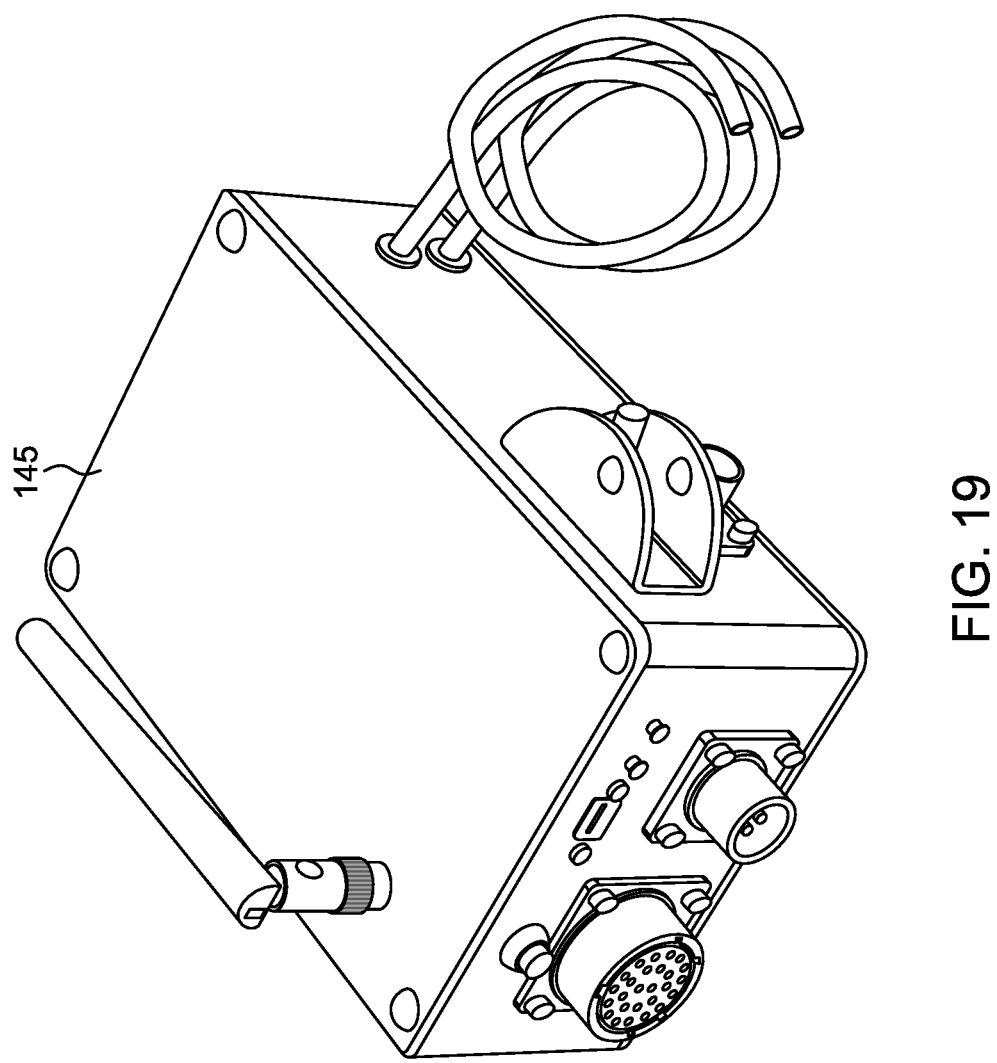
FIG. 19 is an exemplary embodiment of the autopilot and guidance control system of the present invention.
Figure 20:
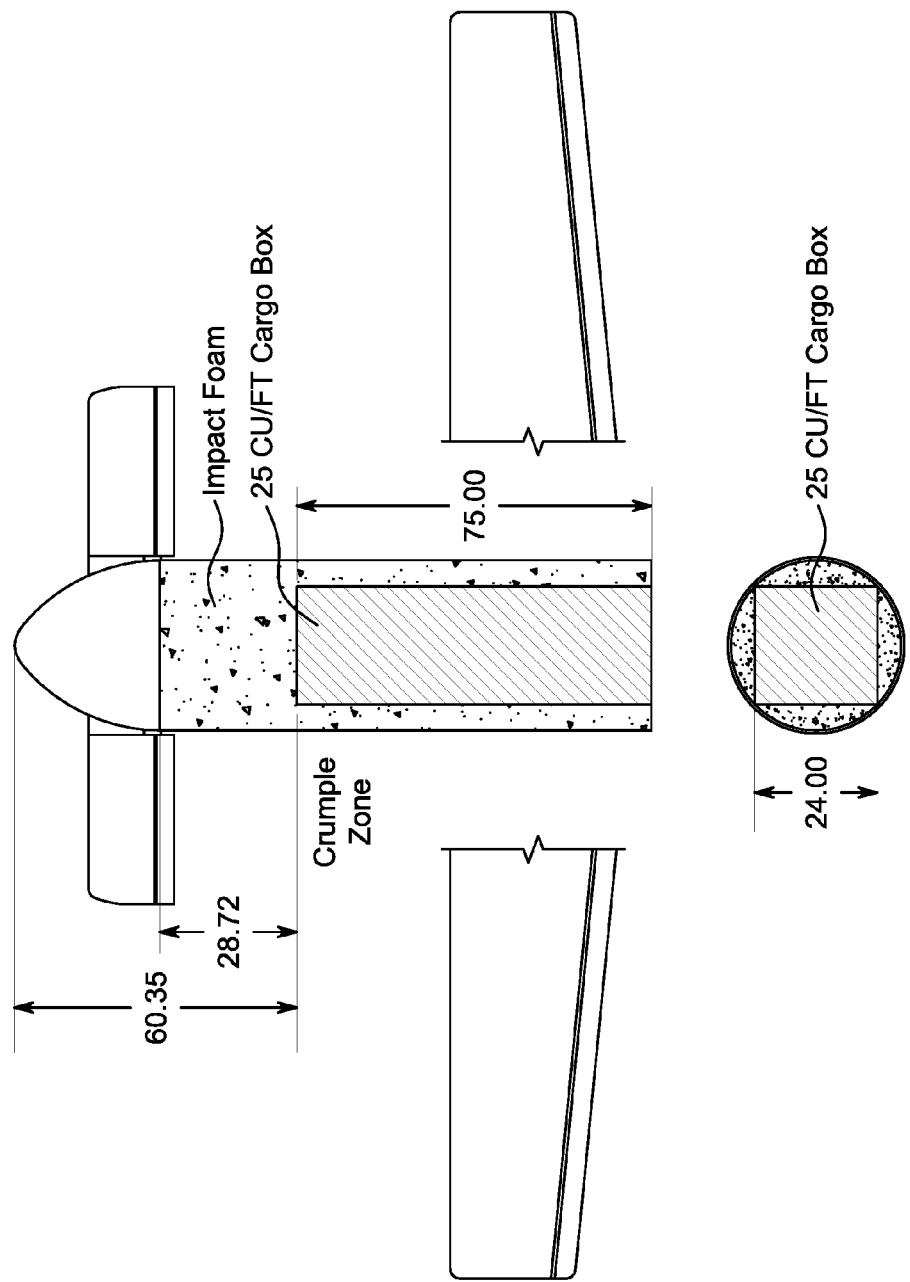
FIG. 20 is an exemplary embodiment of the UAV of the present invention with an internal cargo box located inside a cylindrical fuselage and protected by impact foam.

FIG. 19 is an exemplary embodiment of the autopilot and guidance control system 145 of the present invention. In one embodiment, the autopilot is capable of autonomous flight to a predetermined location after being jettisoned from a mothership at a predetermined altitude. Exemplary specifications of an autonomous autopilot of the present invention include the following:

32 Bit ARM, RTOS, Failsafe Processor
Fixed-Wing Autonomous Guidance
GPS (u-blox)
Magnetometer (ST Micro)
Barometer
Pitot Static Airspeed
6-DOF AHRS (ST Micro)
LIDAR aided landing
433 MHZ Telemetry Radios
Manual Radio Control Mode
Autoland and Failsafe Routines FIG. 20 is an exemplary embodiment of the UAV of the present invention with an internal cargo box located inside an optional cylindrical fuselage and protected by impact foam with exemplary dimensions shown for reference.

Figure 21:
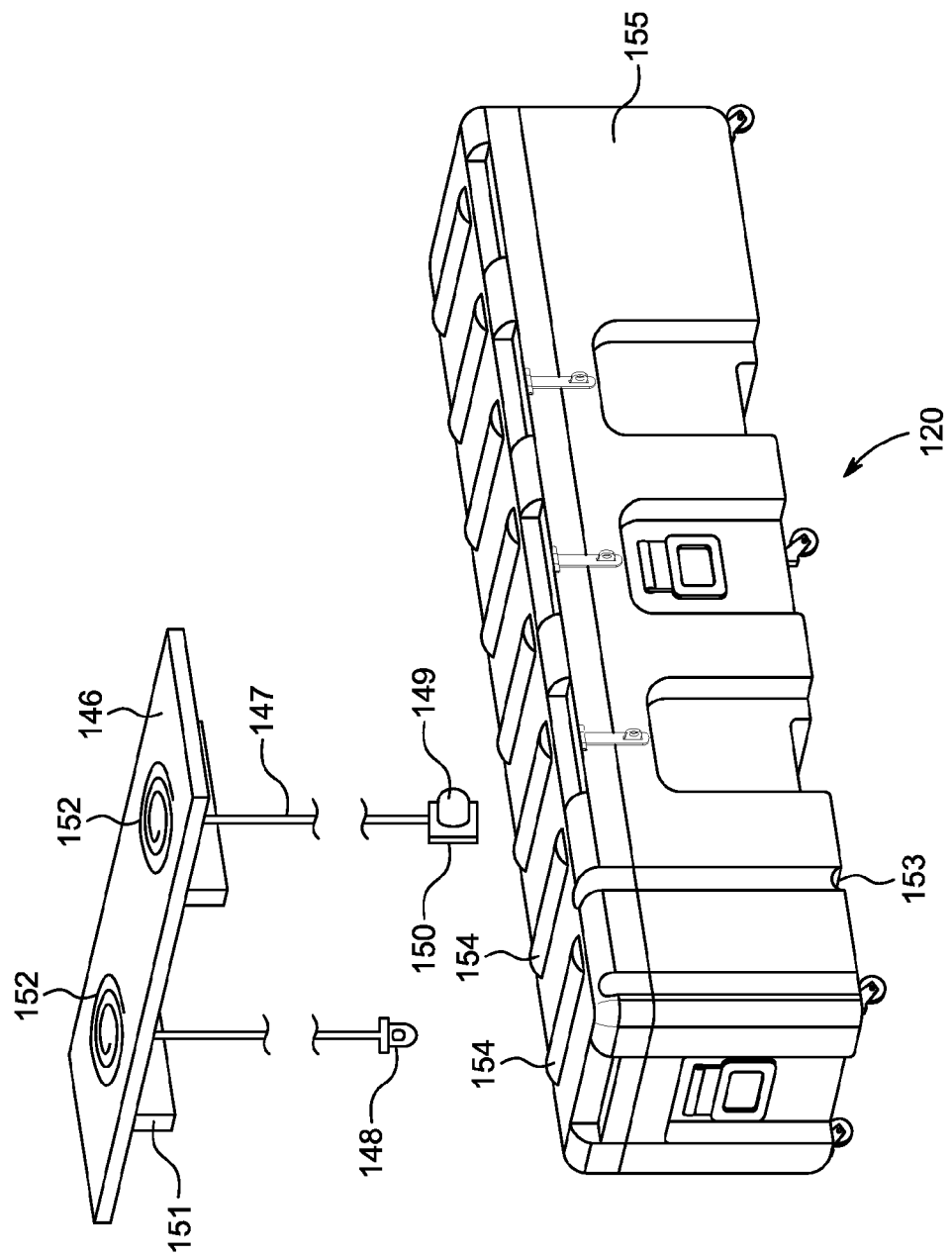
FIG. 21 is an exemplary embodiment of the UAV of the present invention with a detachable main wing mounting platform that provides a strong mounting and pivot point for the main wings and optionally features one or more torsion springs to force the wings from a stowed to a deployed position after being jettisoned from a mothership.

FIG. 21 is an exemplary embodiment of the UAV of the present invention with a detachable main wing mounting platform 146 that provides a strong mounting and pivot point for the main wings and optionally features one or more torsion springs 152 to force the wings from a stowed to a deployed position after being jettisoned from a mothership. The wing mounting platform may feature guide rails 151 to matably engage the fuselage cargo container 120 to prevent slippage. One or more ribs 154 may be formed as part of the fuselage cargo container for the purpose of providing structural rigidity as well as a series of positions to index the wing mounting platform. In certain loading configurations, it may be desirable from a weight and balance perspective for the main wings to be mounted farther forward than in other loading situations where the wings may be desirably located at the rearmost portion of the fuselage cargo container. One or more mounting straps 147 depend from the wing mounting platform for the purpose of wrapping around or connecting to the fuselage cargo container to retain the wings thereto. In one embodiment, the mounting straps may be a nylon webbing material such as is commonly used in seat belts. In another embodiment, the mounting straps may be a cable. The mounting straps may be configured so that the ends easily connect to each other such as by a latch mechanism commonly used in seat belts featuring a male tab 148 and a female receptacle 150. The female receptacle may feature a large protruding release button 149, which may be positioned to contact the ground during landing, thereby releasing the wing mounting platform and the connected wings from the fuselage cargo container in order to render the cargo container ready for transportation after sliding to a stop after landing. A notch 153 may be provided in the fuselage cargo container to receive the mounting straps. It will be appreciated by a person skilled in the art that the front mounted canard wings may be similarly mounted to a wing mounting platform in area 155 near or at the front of the fuselage cargo container with a similar automatic release mechanism so that both sets of wings automatically jettison away from the fuselage cargo container upon landing and may be left behind, recycled or discarded by the recipients of the cargo delivery.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An unmanned delivery aircraft comprising:
   a fuselage cargo container comprising a lid and a bottom portion;
   a first pivoting wing system directly connected to the lid;
   a second pivoting wing system directly connected to the lid; and
   a guidance control system;
   wherein each of the first and second pivoting wing systems can pivot from a stowed position to a deployed position.

2. The unmanned delivery aircraft of claim 1, wherein the first pivoting wing system comprises a single pivoting wing.

3. The unmanned delivery aircraft of claim 1, wherein the first pivoting wing system comprises two pivoting wings.

4. The unmanned delivery aircraft of claim 1, wherein the second pivoting wing system comprises two pivoting wings.

5. The unmanned delivery aircraft of claim 1, wherein the first and second pivoting wing systems have the same design.

6. The unmanned delivery aircraft of claim 1, wherein the first pivoting wing system comprise main wings and the second pivoting wing system comprise canard wings.

7. The unmanned delivery aircraft of claim 1, wherein the lid is detachably connected to the bottom portion.

8. The unmanned delivery aircraft of claim 1, further comprising at least one latch securing the lid to the bottom portion.

9. The unmanned delivery aircraft of claim 1, wherein the fuselage cargo container comprises at least one storage compartment.

10. The unmanned delivery aircraft of claim 1, wherein the fuselage cargo container comprises one or more handles.

11. The unmanned delivery aircraft of claim 1, wherein the fuselage cargo container is airtight.

12. The unmanned delivery aircraft of claim 1, wherein each pivoting wing system comprises a movable flight control surface.

13. The unmanned delivery aircraft of claim 12, further comprising at least one actuator on each wing system to move the flight control surface for that wing system.

14. The unmanned delivery aircraft of claim 1, further comprising one or more torsion springs at a pivot point of at least one of the first and second wing systems.

15. The unmanned delivery aircraft of claim 1, wherein the guidance control system can be operated in autonomous or manual modes.

16. The unmanned delivery aircraft of claim 1, further comprising a nose cone detachably connected to the fuselage cargo container.

17. The unmanned delivery aircraft of claim 16, wherein the guidance control system is located inside the nose cone.

18. The unmanned delivery aircraft of claim 1, wherein the first and second pivoting wing systems can each pivot 90 degrees.

19. An unmanned delivery aircraft comprising:
   a fuselage comprising a lid detachably connected to a bottom portion;
   at least two wings pivotally connected directly to the lid;
   at least a spring located at a pivot point of the at least two wings; and
   a guidance control system.

* * * * *